(12) United States Patent
Kitada

(10) Patent No.: US 7,706,358 B2
(45) Date of Patent: Apr. 27, 2010

(54) IP APPLICATION SERVICE PROVIDING SYSTEM

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 11/705,094

(22) Filed: Feb. 12, 2007

(65) Prior Publication Data
US 2008/0075097 A1 Mar. 27, 2008

(30) Foreign Application Priority Data
Sep. 26, 2006 (JP) .............................. 2006-260830

(51) Int. Cl.
*H04L 12/66* (2006.01)
(52) U.S. Cl. ...................... 370/352; 370/401
(58) Field of Classification Search ........................ None
See application file for complete search history.

(56) References Cited

U.S. PATENT DOCUMENTS

| | | | | |
|---|---|---|---|---|
| 7,333,492 | B2 * | 2/2008 | Wu et al. ..................... 370/401 |
| 2004/0024879 | A1 * | 2/2004 | Dingman et al. ............ 709/227 |
| 2005/0033985 | A1 * | 2/2005 | Xu et al. ..................... 713/201 |
| 2005/0201320 | A1 * | 9/2005 | Kiss et al. ................... 370/328 |
| 2005/0201357 | A1 * | 9/2005 | Poyhonen ................... 370/352 |
| 2006/0045068 | A1 * | 3/2006 | Wu et al. ..................... 370/352 |
| 2006/0077988 | A1 * | 4/2006 | Cheng et al. ................ 370/401 |
| 2006/0230163 | A1 * | 10/2006 | Fish, III ..................... 709/229 |
| 2006/0272009 | A1 * | 11/2006 | Stott ............................. 726/3 |
| 2008/0267096 | A1 * | 10/2008 | Nakamura et al. .......... 370/352 |
| 2009/0052435 | A1 * | 2/2009 | Nakamura et al. .......... 370/352 |

FOREIGN PATENT DOCUMENTS

JP 2005-260715 9/2005

* cited by examiner

*Primary Examiner*—Steven H Nguyen
(74) *Attorney, Agent, or Firm*—Staas & Halsey LLP

(57) ABSTRACT

An IP application service providing method enabling inbound communication in IP application communication intended between an internal node concealed from an outside network and belonging to an inside network and an external node belonging to the outside network through a gateway device set to permit only outbound communication, includes periodically transmitting a control packet aiming at notifying of a control channel port and at maintaining a communication permission entry of a control channel path to a connection support device on the outside network from the internal node subordinated to the gateway device; notifying the internal node of a connecting destination address/port pair associated with the external node via the control channel from the connection support device; and actively opening a data channel of an IP application to the notified connecting destination address/port pair.

7 Claims, 29 Drawing Sheets

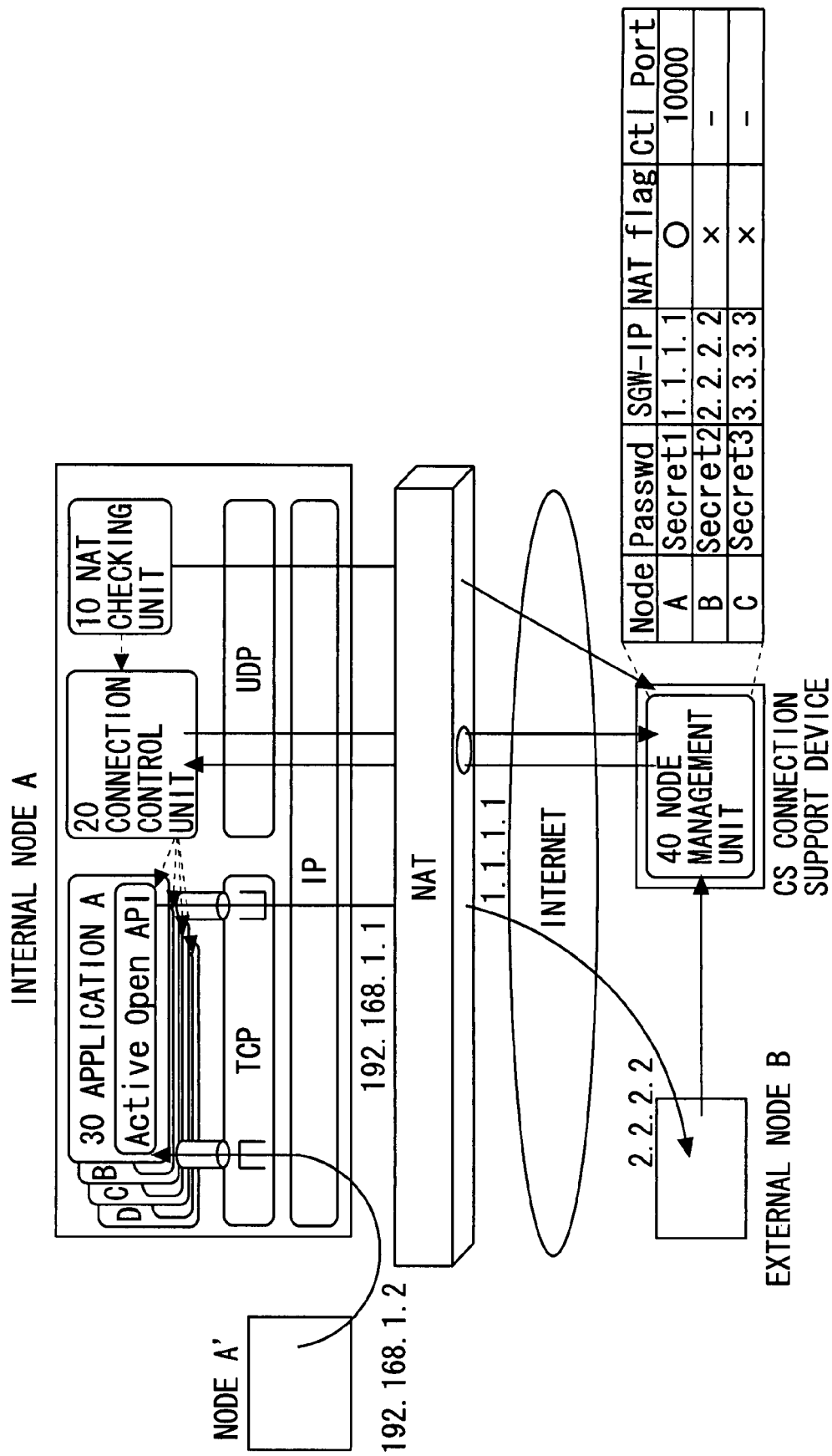

FIG. 24

| | OSI MODEL | DESCRIPTION | EXAMPLE OF PROTOCOLS | |
|---|---|---|---|---|
| 7 | APPLICATION LAYER | PROCESS INTRINSIC TO APPLICATION | HTTP SMTP | →LARGE DEPENDENCE ON APPLICATION |
| 6 | PRESENTATION LAYER | DEFINITION OF DATA FORMAT AND TRANSLATION PROCESS | HTML MIME | |
| 5 | SESSION LAYER | CONNECTION MANAGEMENT (START/END OF CONNECTION) | RPC | →NON-DEPENDENCE ON APPLICATION |
| 4 | TRANSPORT LAYER | DATA TRANSFER MANAGEMENT (RETRANSMISSION PROCESS ETC) | TCP UDP | |
| 3 | NETWORK LAYER | ADDRESS MANAGEMENT/ROUTE SELECTION | IP | |
| 2 | DATA LINK LAYER | IDENTIFICATION AND TRANSFER OF DATA FRAME | Ethernet PPP | |
| 1 | PHYSICAL LAYER | SPECIFICATION OF SHAPES OF CONNECTOR AND CABLE | 100Base-T | |

COMPONENTS OF APPLICATION SOFTWARE: { layers 7, 6, 5 }

IMPLEMENTING POSITION OF ACTIVE OPEN API

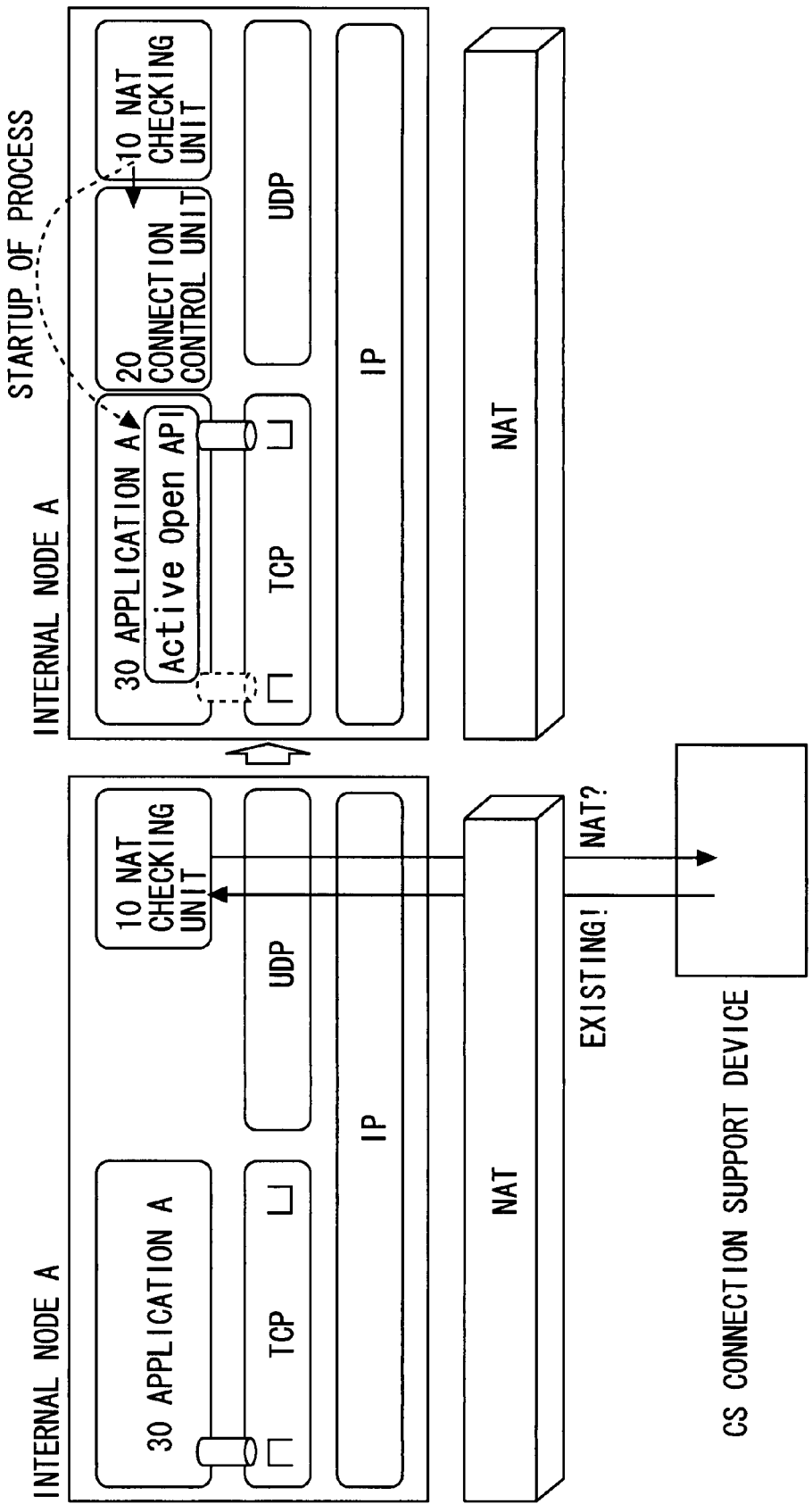

IP APPLICATION SERVICE PROVIDING SYSTEM

BACKGROUND OF THE INVENTION

The present invention relates generally to an IP (Internet Protocol) application service providing system, and more particularly to a connection support technology enabling a node, connected to an IP network such as the Internet, to easily perform IP application communication without depending on an existence/non-existence state of NAT/FW via a gateway device such as a network address translation (or translator) or a firewall (NAT/FW).

In an IPv4 network, the network address translation (NAT) is widely employed in terms of saving global IP addresses. The NAT, especially a device called NAPT (Network Address Port Translation), translates a private address and a source port of an in-office/home network into a global address and a source port according to the NAPT (a NAPT table) (see FIG. 1), thereby enabling accesses to an outside network ONW from a plurality of internal nodes A.

Further, in an IPv6 network, though an address starvation problem disappears, it is considered that there will be a continuous use of a firewall (FW) function (see FIG. 2) of permitting only a response of communication from the inside toward the outside in a way that conceals an in-office/home network from an outside network ONW in terms of security.

Thus, the NAT/FW is effective in outside trigger communication (outbound communication) from the inside but, in inside trigger communication (inbound communication) from the outside, has no entry permitting the inbound communication with the result that a packet does not reach a node and therefore encounters with a big obstacle in the case of operating a server application and a P2P (Peer-to-Peer) application on the nodes subordinated to the NAT/FW (see FIG. 3). This type of problem is generally called a [NAT-Traversal problem].

Considered as the conventional technologies for solving this problem are a technology (1) of setting up a static entry in the NAT (refer to Part 1: static NAT in FIG. 4), a technology (2) of controlling the entry on the basis of a protocol by using UPnP (Universal Plug and Play) (refer to Part 2: UPnP in FIG. 4) and a technology (3) of generating the entry that permits the inbound communication in a pseudo manner by predicting a post-transform NAT entry (refer to Part 3: UDP (User Datagram Protocol) Hole Punching), and so on.

In the technology (1) generally called static NAT, for instance, the NAT entry is set so that "192.168.1.1:80" (an inside private address/port pair) is uniquely translated into "1.1.1.1:80" (an outside global address/port pair), whereby a Web server appears to an external node B as if being opened at a global address "1.1.1.1". In fact, the Web server operates at the private address "192.168.1.1" subordinated to the NAT.

The conventional technology (2) is a scheme of automating the static NAT, wherein an UPnP protocol is operated between the node and the NAT, and the NAT is controlled from the node so as to map "192.168.1.1:80" to "1.1.1.1:80" by use of an AddPortMapping message, thereby setting up the same entry as by the static NAT.

The conventional technology (3) is a scheme in which the internal node A under the NAT predicts a post-translation global IP address/port pair by employing an STUN (Simple Traversal of UDP through NATs) protocol specified by RFC3489 (see FIGS. 9 and 10), generates the NAT entry using a dummy packet and notifies of a communication partner node of this NAT entry, and the external node B starts connecting to the post-translation IP address/port pair, thereby enabling the communication with the internal node A.

There arise, however, the following problems inherent in these conventional technologies. The conventional technology (1) requires detailed settings and knowledge about the NAT for every application, i.e., requires a large number of operation steps.

The conventional technology (2) requires support of the same protocol for both of the node and the NAT, and, if the node and the NAT are not within the same segment (namely, if the NATs are multi-staged and if a router is situated on a route up to the NAT), an UPnP packet (a multicast packet) is unable to reach the NAT, resulting in being uncontrollable.

In the conventional technology (3), there exist some NATs that can not be applied depending on their types (which will be explained later on), and, especially in the case of TCP (Transmission Control Protocol) communication, there are many cases of filtering an inbound TCP SYN packet (connection request) (a state full inspection function; see FIG. 13) though capable of generating the NAT entry itself, with the result that the conventional technology (3) can not be applied depending on an environment.

The NATs are roughly classified into two types such as Cone NAT and Symmetric NAT, wherein the Cone NAT is sub-classified into three types (see FIGS. 5-8), while the Symmetric NAT can not, because of allocating the different global port to every destination, be supported by the technology that predicts the post-translation port as by the STUN and the UDP Hole Punching (see FIGS. 11 and 12).

Further, all of the conventional technologies emphasize how the inbound communication toward the inside is started from the outside of the NAT/FW, there is consequently a case of being unable to perform the communications at an arbitrary timing (namely, the connection can not be established unless synchronizing with action from under the NAT), and, in the case of scheming to operate a server application provided at a well-known port, a port conflict (where a plurality of applications can be provided at the same global port because of being unable to share the global port) occurs between the nodes and the applications.

For example, even when trying to configure two Web servers under the NAT, the second Web server cannot be provided at a default port No.80. Precisely, this implies that though the Web server itself operates at the port No.80, since the mapping to "1.1.1.1:80" has already been consumed, for example, if trying to open the second Web server specified by "192.168.1.2:80" to the outside, there is no alternative but to map it to a port other than No.80 such as "1.1.1.1:81", but it is known to the external node B that this address/port pair "1.1.1.1:81" is previously provided at a different port, and a Web page can not be browsed unless [:http://1.1.1.1:81] etc is inputted. If provided at the port No.80, the port number can be omitted such as [http://1.1.1.1].

Thus, as compared with the case of having no existence of the NAT/FW, there is a large restraint on providing the applications, and, as the case may be, such a problem arises that the application operations themselves are required to be rearranged due to the existence of the NAT/FW.

The following is a related art to the present invention.
[Patent document 1] Japanese Patent Application Laid-Open Publication No.2005-260715

SUMMARY OF THE INVENTION

It is an object of the present invention to provide a technology enabling an IP application service to be easily provided without being aware of whether a gateway device such as the NAT/FW exits or not (an intermediary state).

For solving the problems, according to the present invention, an IP application service providing system enables inbound communication from the outside toward the inside in IP application communication intended between an internal node concealed from an outside network and belonging to an inside network and an external node belonging to the outside network through a gateway device set to permit only outbound communication from the inside toward the outside, the internal node subordinated to the gateway device, comprising:

a unit periodically transmitting a control packet aiming at notifying of a control channel port and at maintaining a communication permission entry of a control channel path to a connection support device on the outside network;

a unit receiving notification of a connecting destination address/port pair associated with the external node via the control channel from the connection support device; and a unit actively opening a data channel of an IP application to the notified connecting destination address/port pair.

According to the present invention, an IP application service providing method enabling inbound communication from the outside toward the inside in IP application communication intended between an internal node concealed from an outside network and belonging to an inside network and an external node belonging to the outside network through a gateway device set to permit only outbound communication from the inside toward the outside, comprises:

a first step of periodically transmitting a control packet aiming at notifying of a control channel port and at maintaining a communication permission entry of a control channel path to a connection support device on the outside network from the internal node subordinated to the gateway device;

a second step of notifying the internal node of a connecting destination address/port pair associated with the external node via the control channel from the connection support device; and a third step of actively opening a data channel of an IP application to the notified connecting destination address/port pair.

According to the present invention, the IP application service can be provided without being aware of the existence/non-existence of the gateway device such as the NAT/FW (without depending on the type of the gateway device even if existing and at the arbitrary timing).

Other objects, features and advantages of the present invention will become apparent by reading the specification (an embodiment) that will hereinafter be described when taken in conjunction with the drawings and Scope of Claims appended.

BRIEF DESCRIPTION OF THE DRAWINGS

FIG. 23 is an explanatory diagram of the system in one embodiment of the present invention;

FIG. 24 is an explanatory diagram of an OSI reference model;

FIG. 25 is an explanatory diagram of the system in one embodiment of the present invention;

DETAILED DESCRIPTION OF THE PREFERRED EMBODIMENTS

Figure 1:
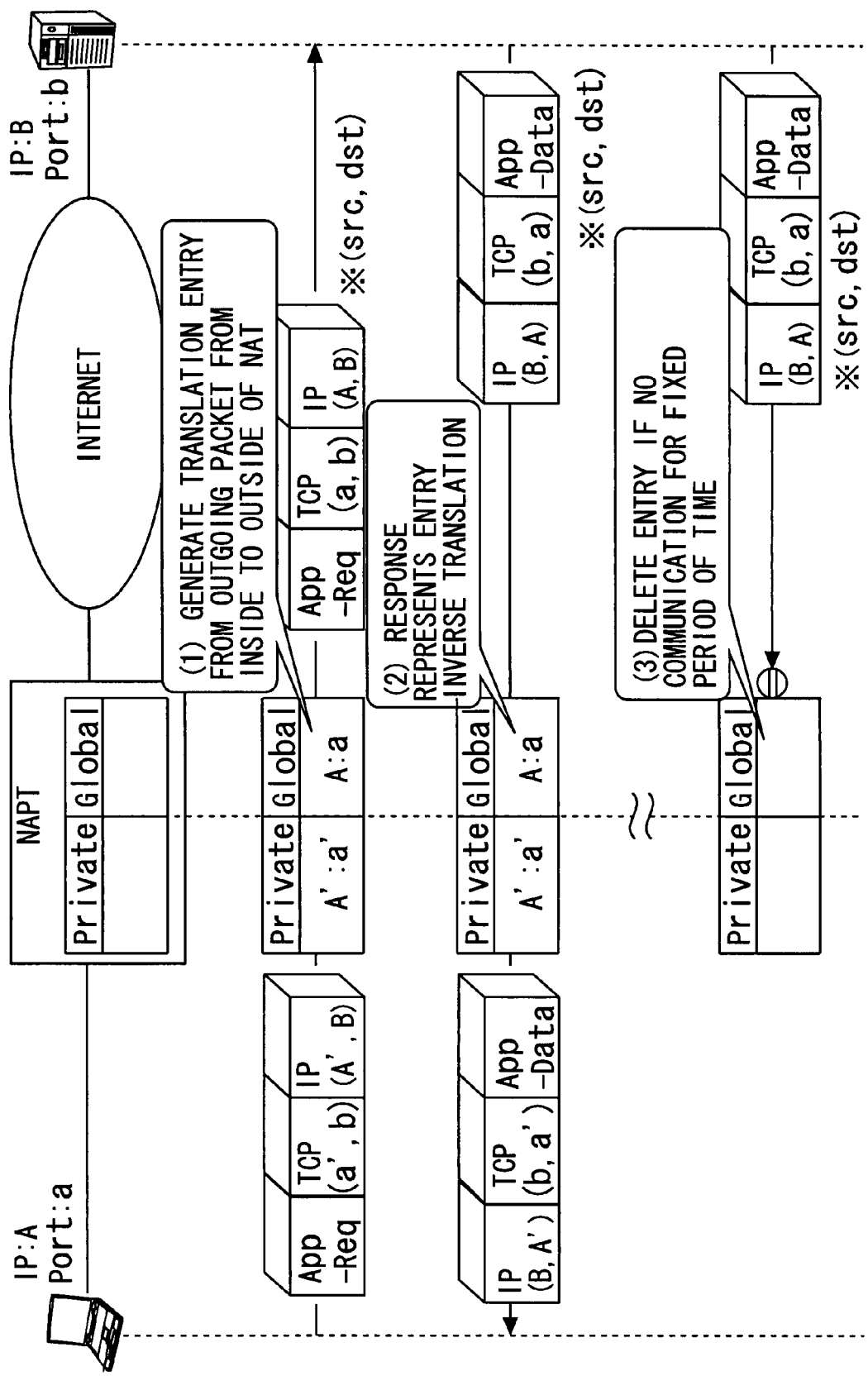
FIG. 1 is an explanatory diagram of an operational principle of NA(P)T.
Figure 2:
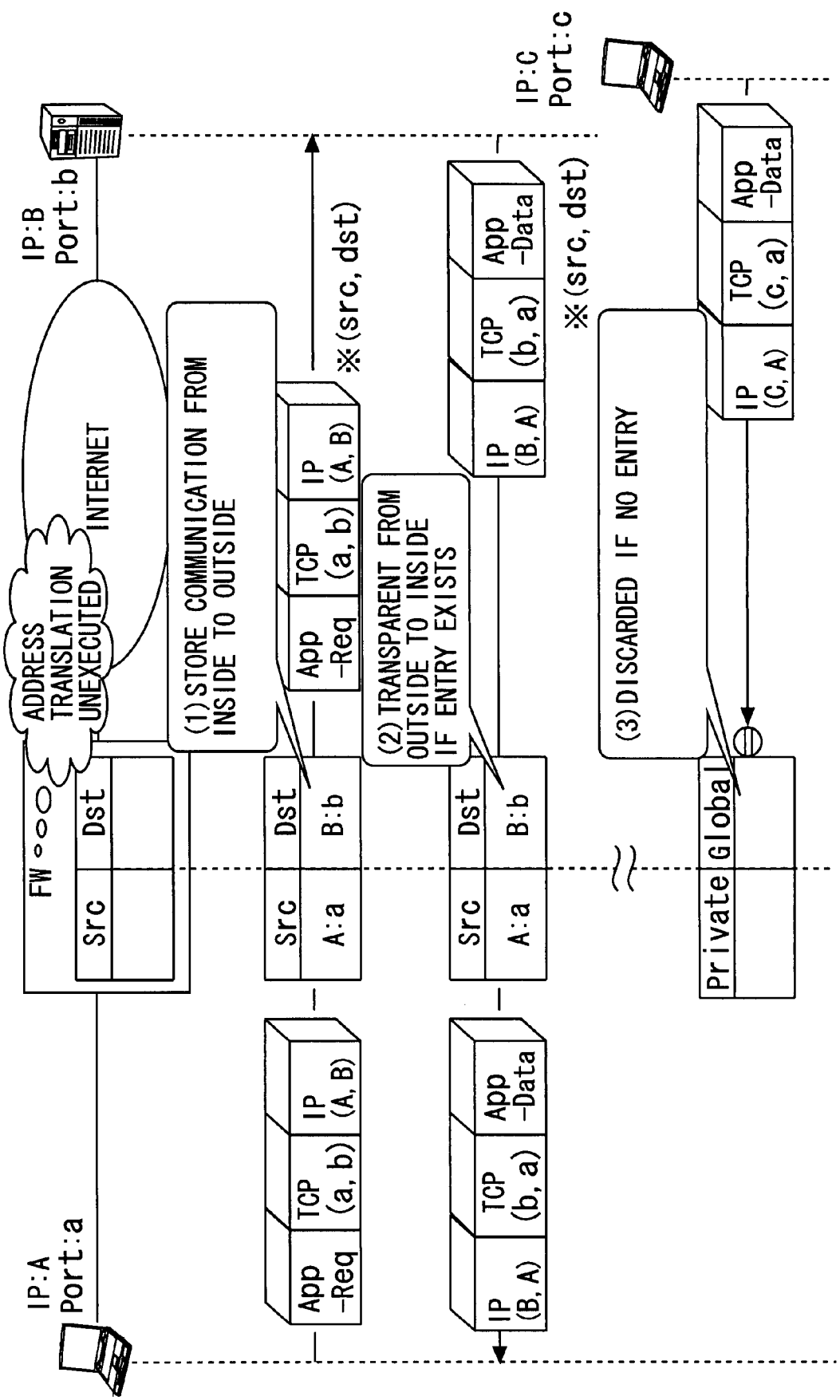
FIG. 2 is an explanatory diagram of an operational principle of FW.
Figure 3:
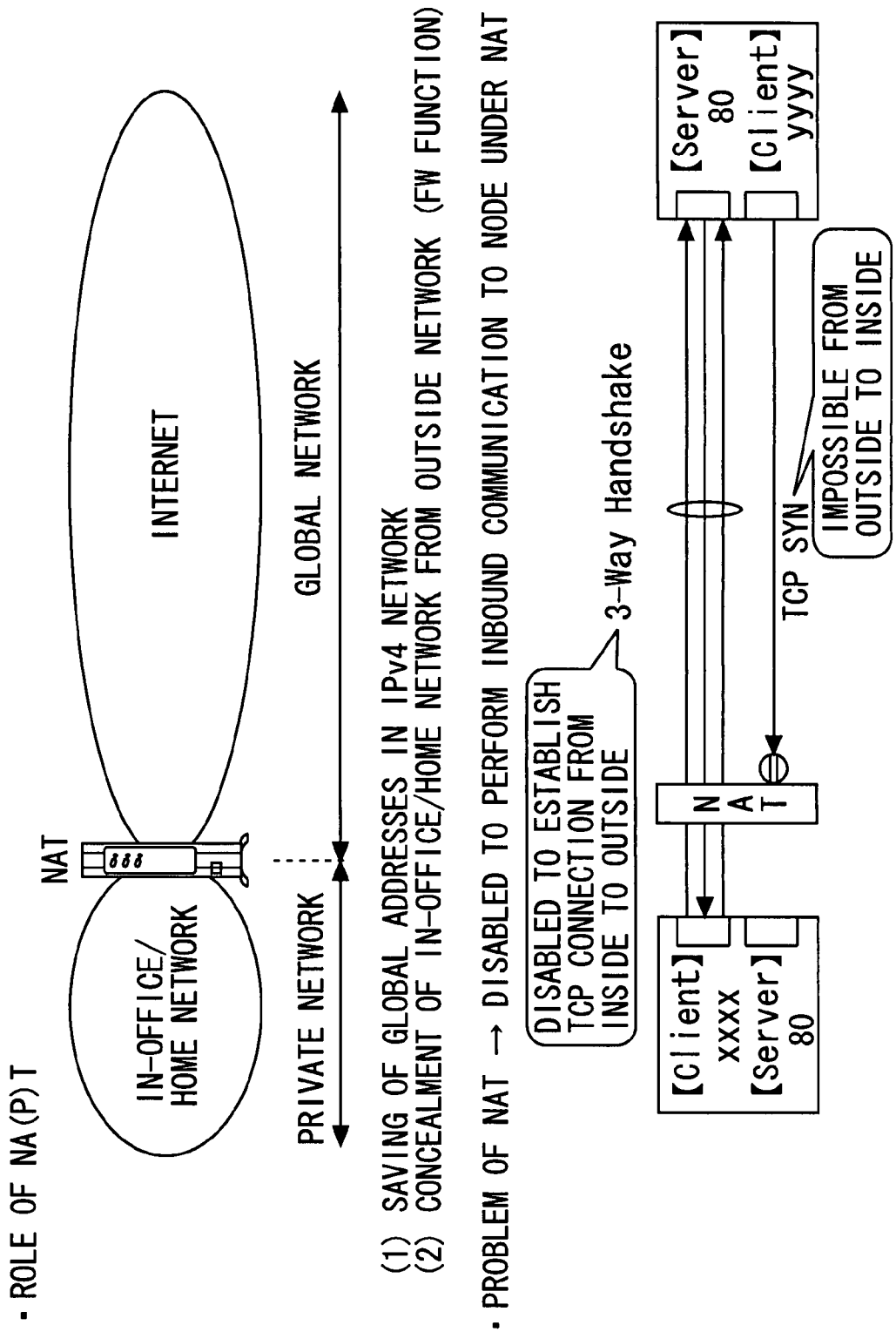
FIG. 3 is a diagram showing a background (a problem of the NAT) of the invention.
Figure 4:
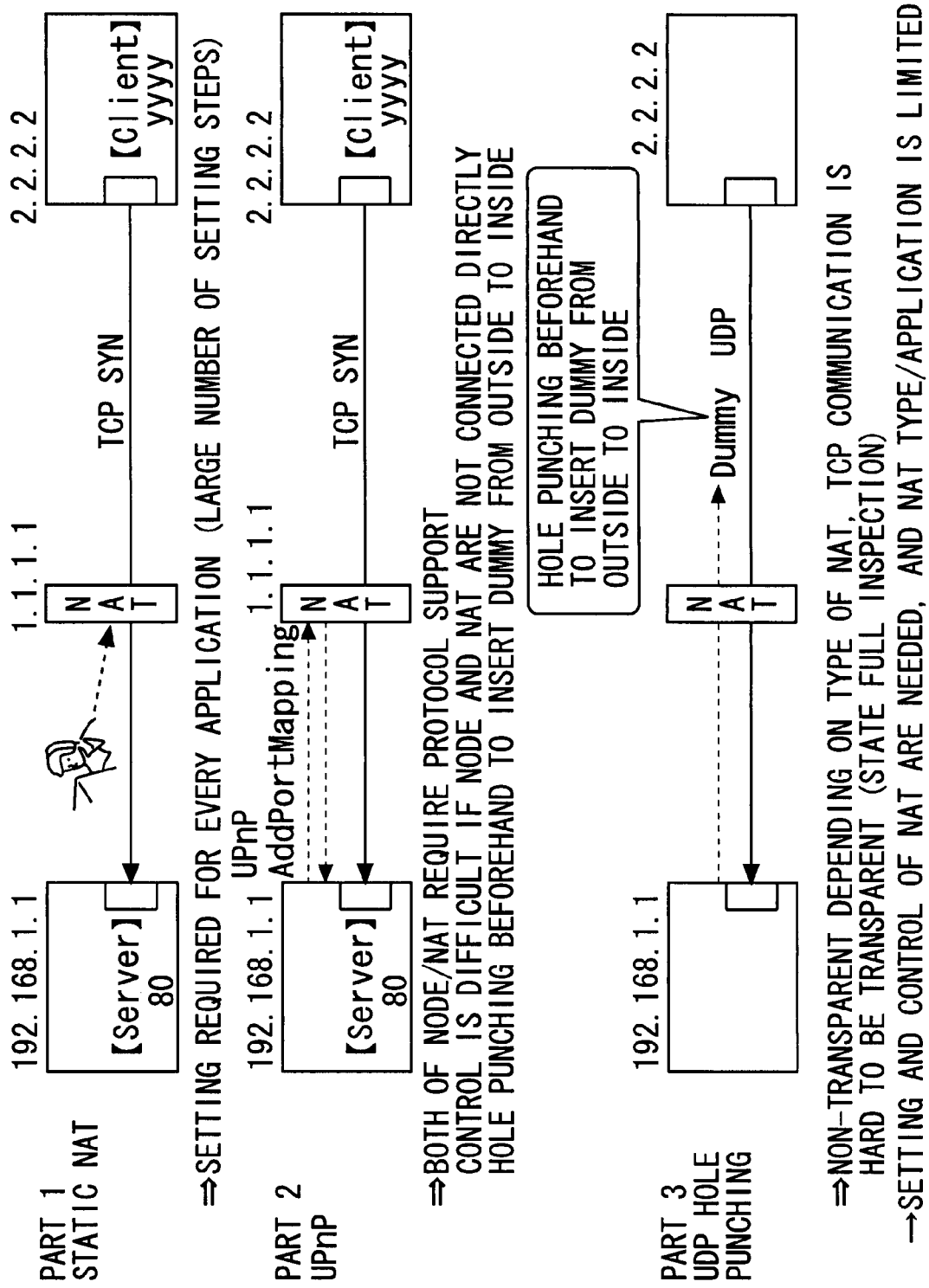
FIG. 4 is a diagram showing the prior art and its problem.
Figure 5:
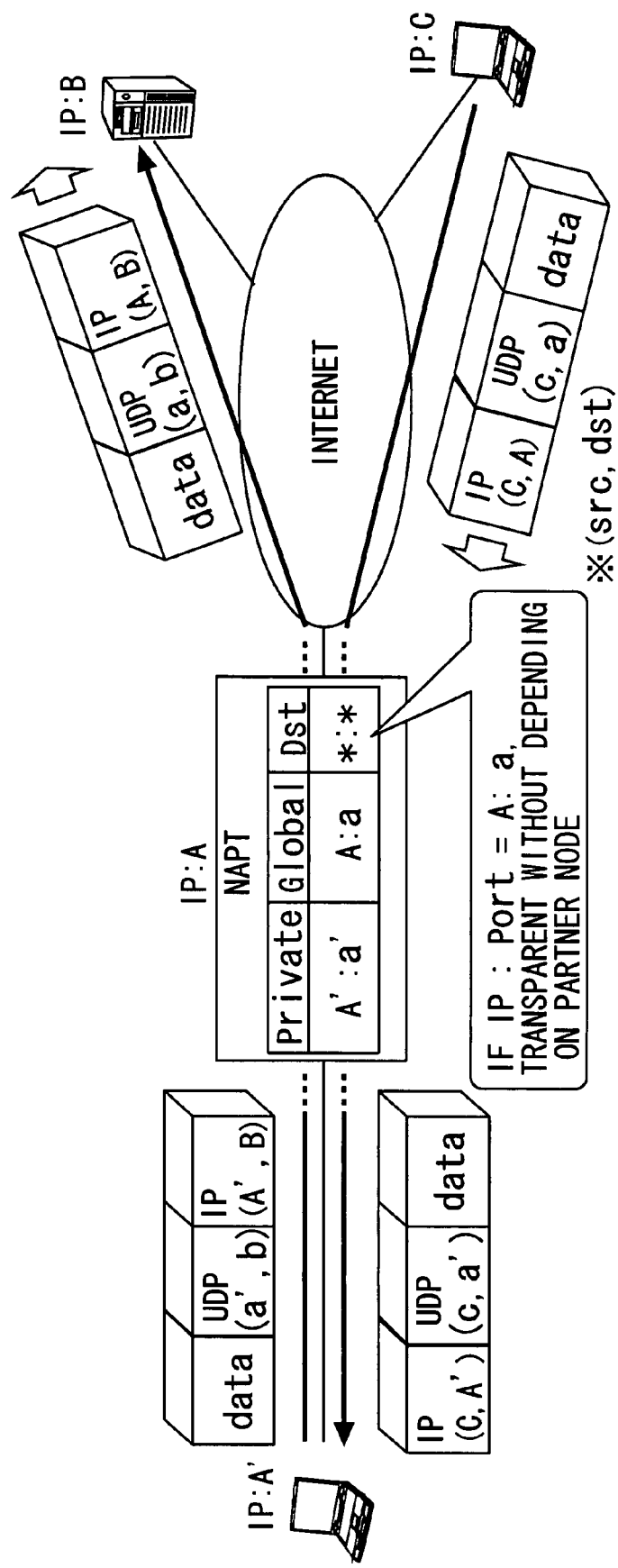
FIG. 5 is a diagram showing a type of the NAT (Full Cone Nat)
Figure 6:
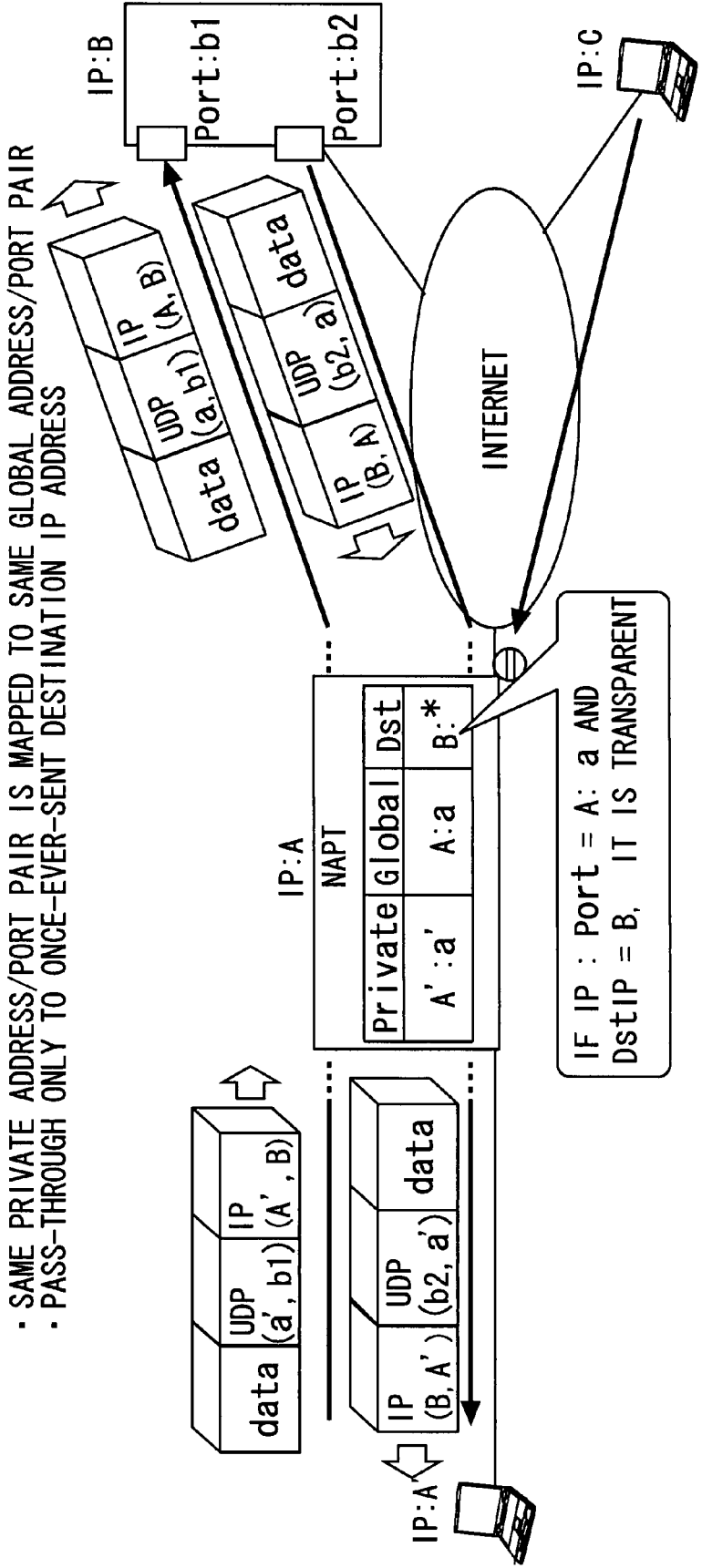
FIG. 6 is a diagram showing a type of the NAT (Restricted Cone Nat)
Figure 7:
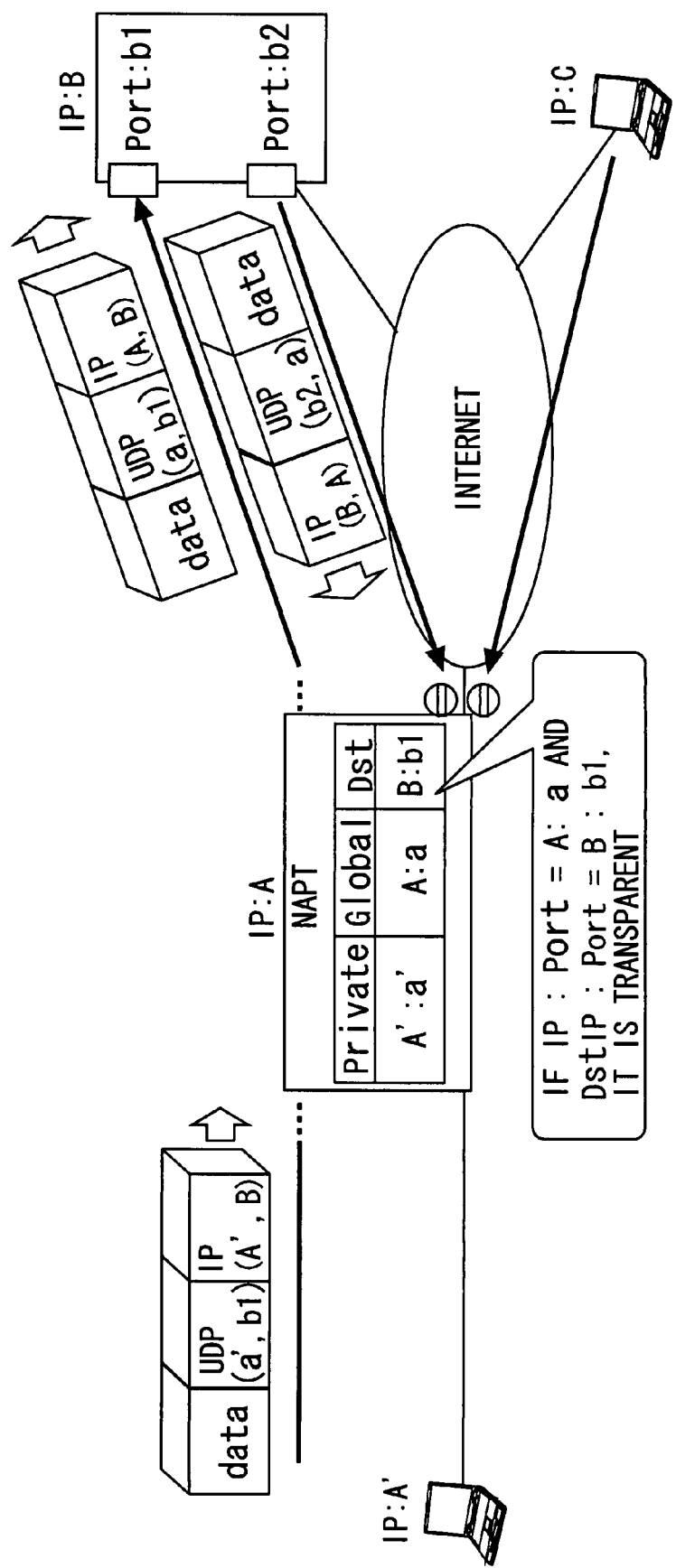
FIG. 7 is a diagram showing a type of the NAT (Port Restricted Cone Nat)
Figure 8:
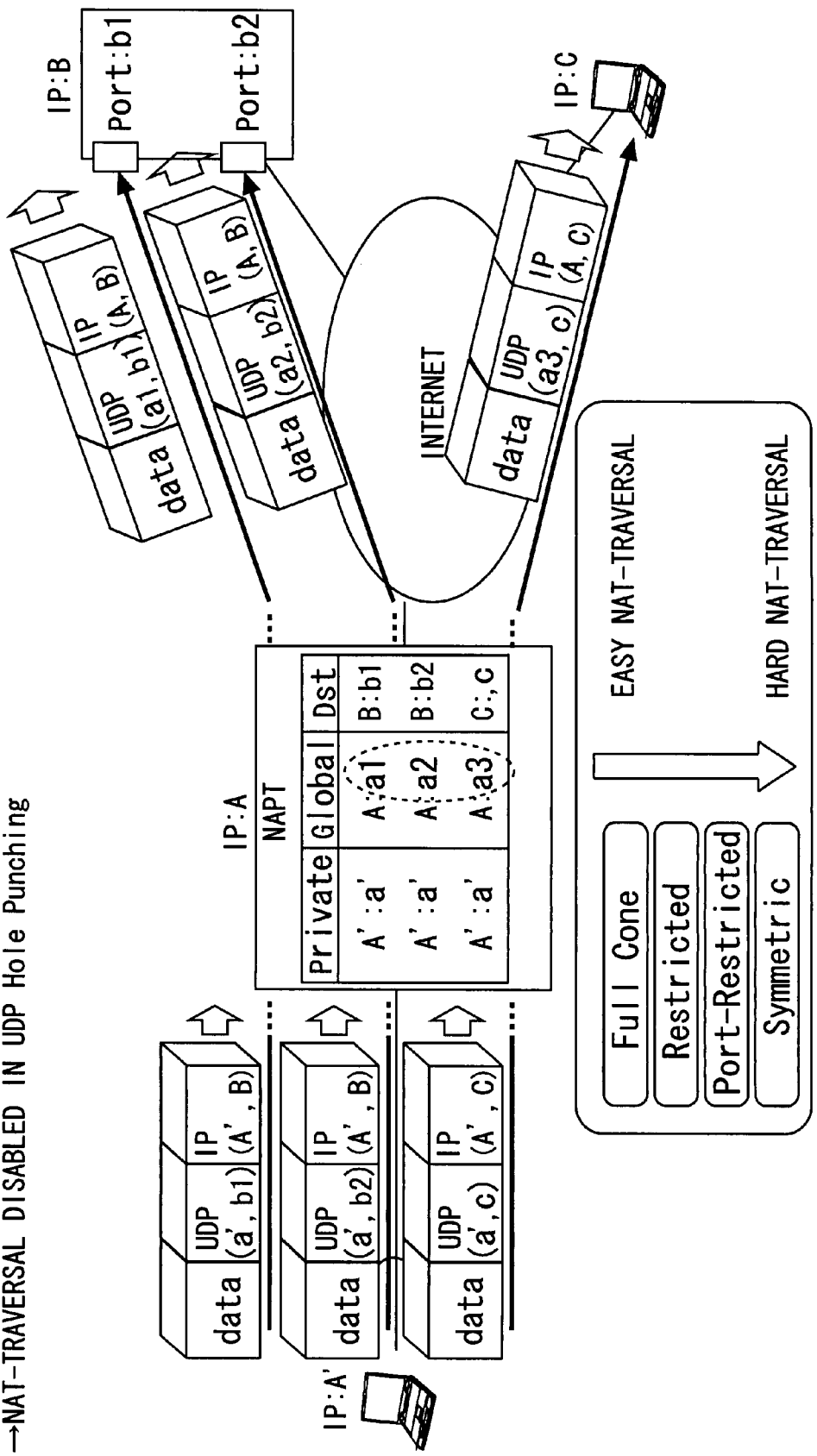
FIG. 8 is a diagram showing a type of the NAT (Symmetric NAT)
Figure 9:
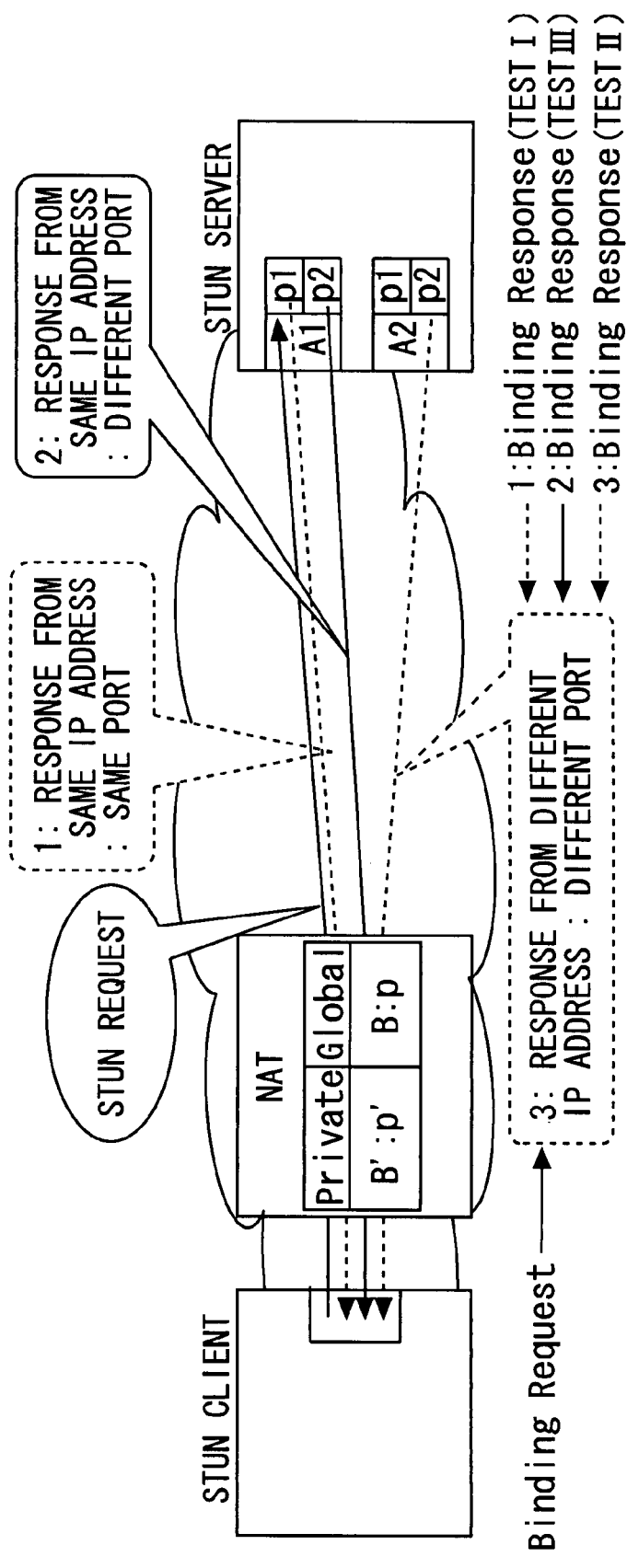
FIG. 9 is an explanatory diagram of an operation of STUN.
Figure 10:
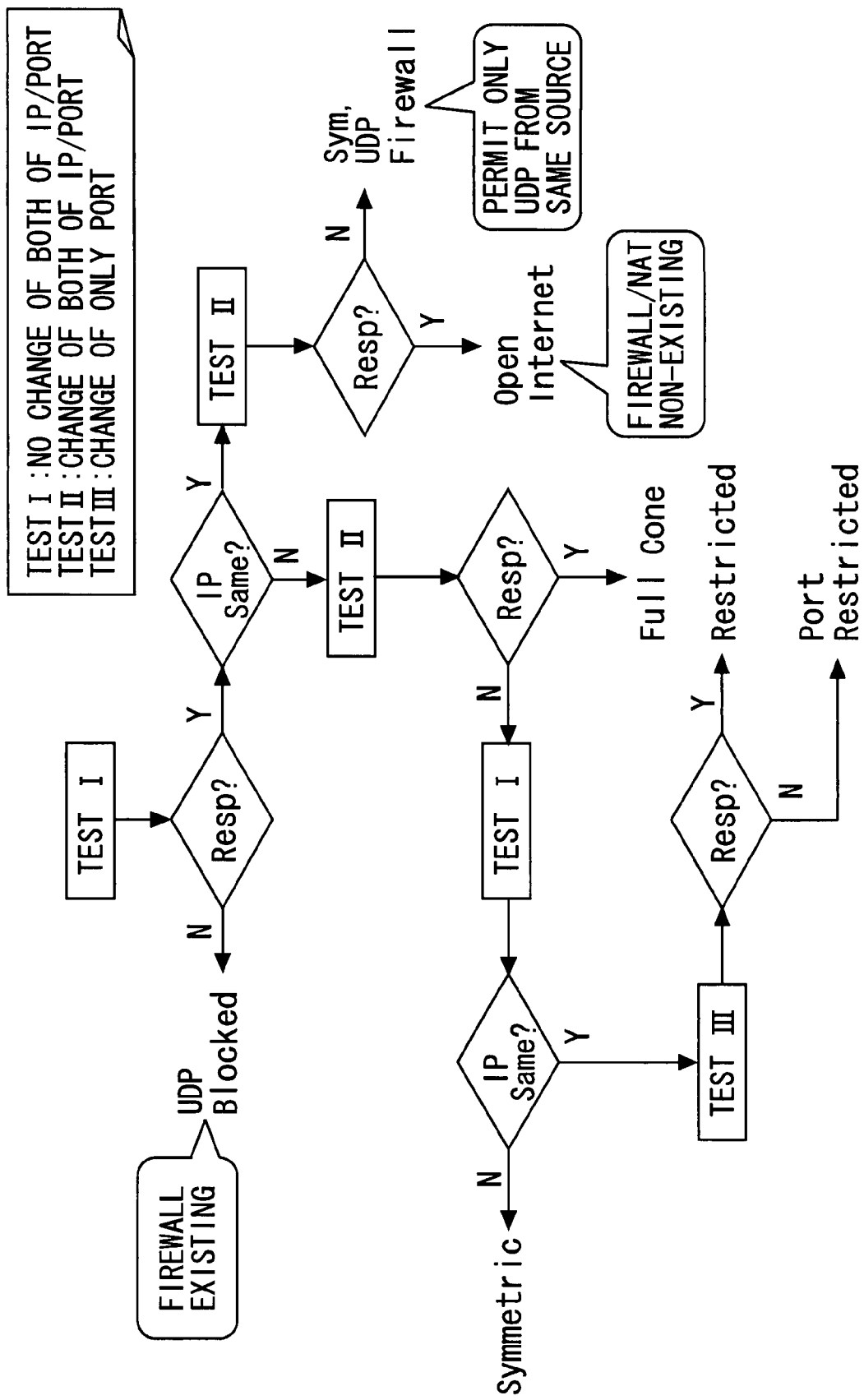
FIG. 10 is a diagram showing an STUN flowchart.
Figure 11:
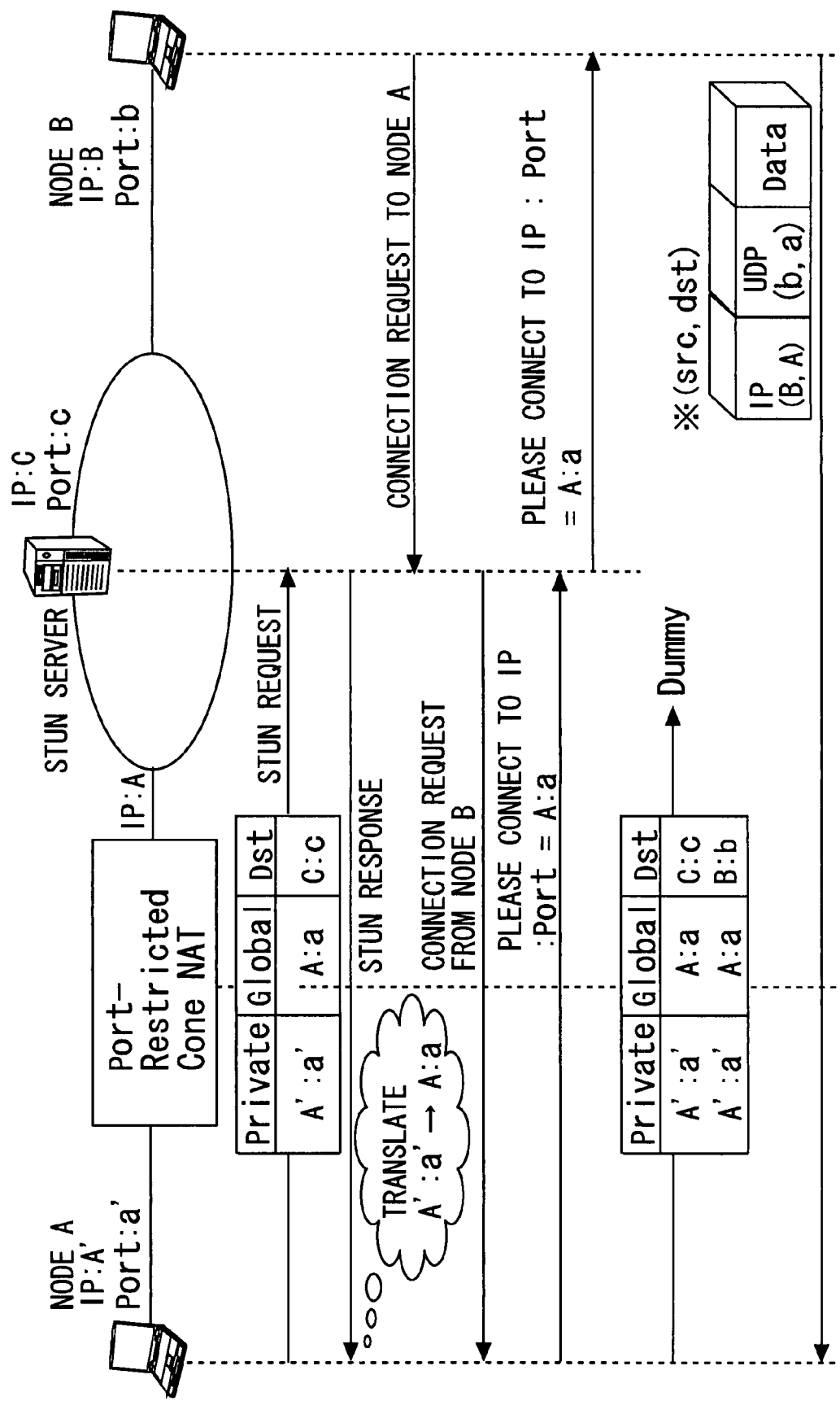
FIG. 11 is a diagram showing an example of succeeding in a connection using STUN and UDP Hole Punching.
Figure 12:
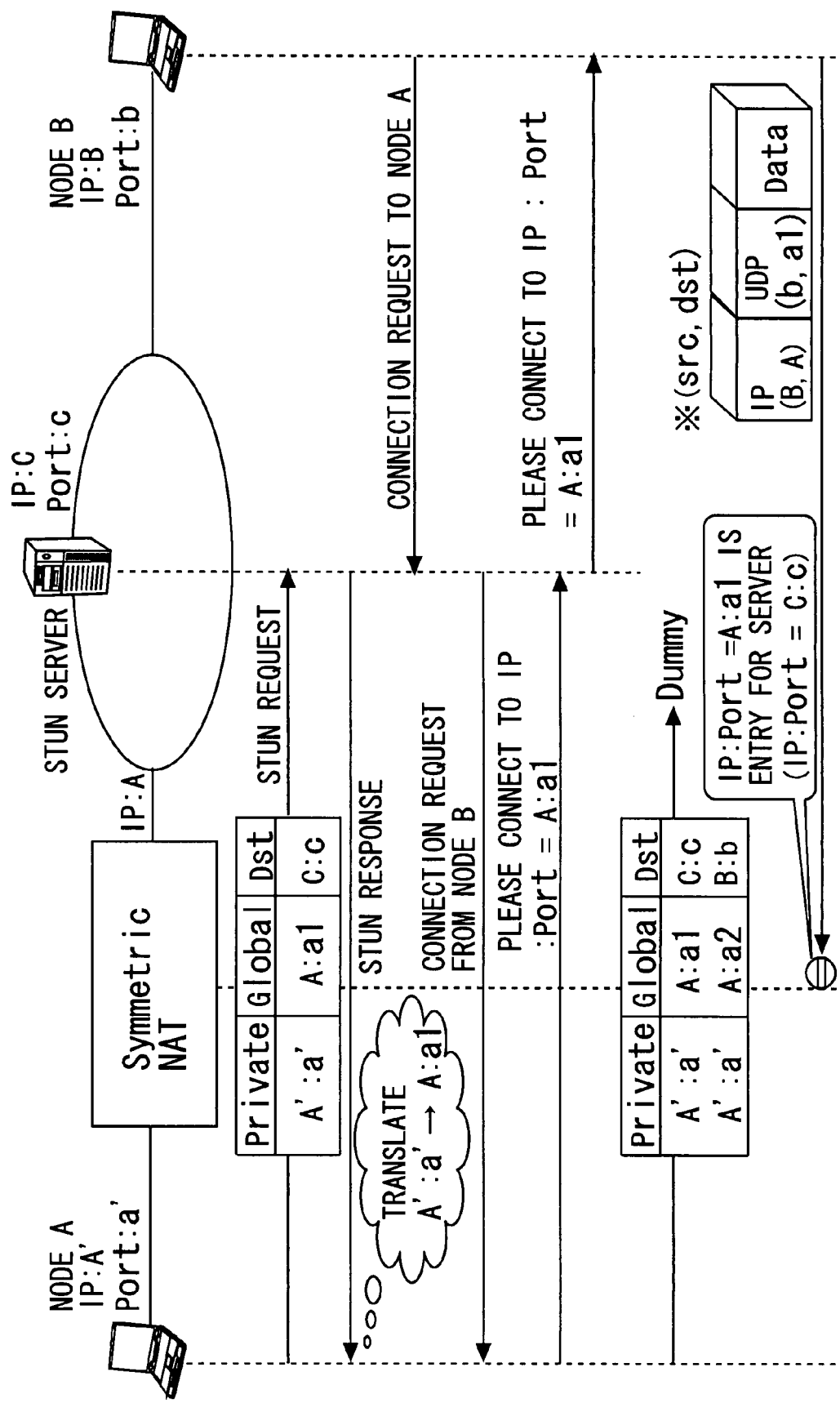
FIG. 12 is a diagram showing an example of a failure of the connection using STUN and UDP Hole Punching.
Figure 13:
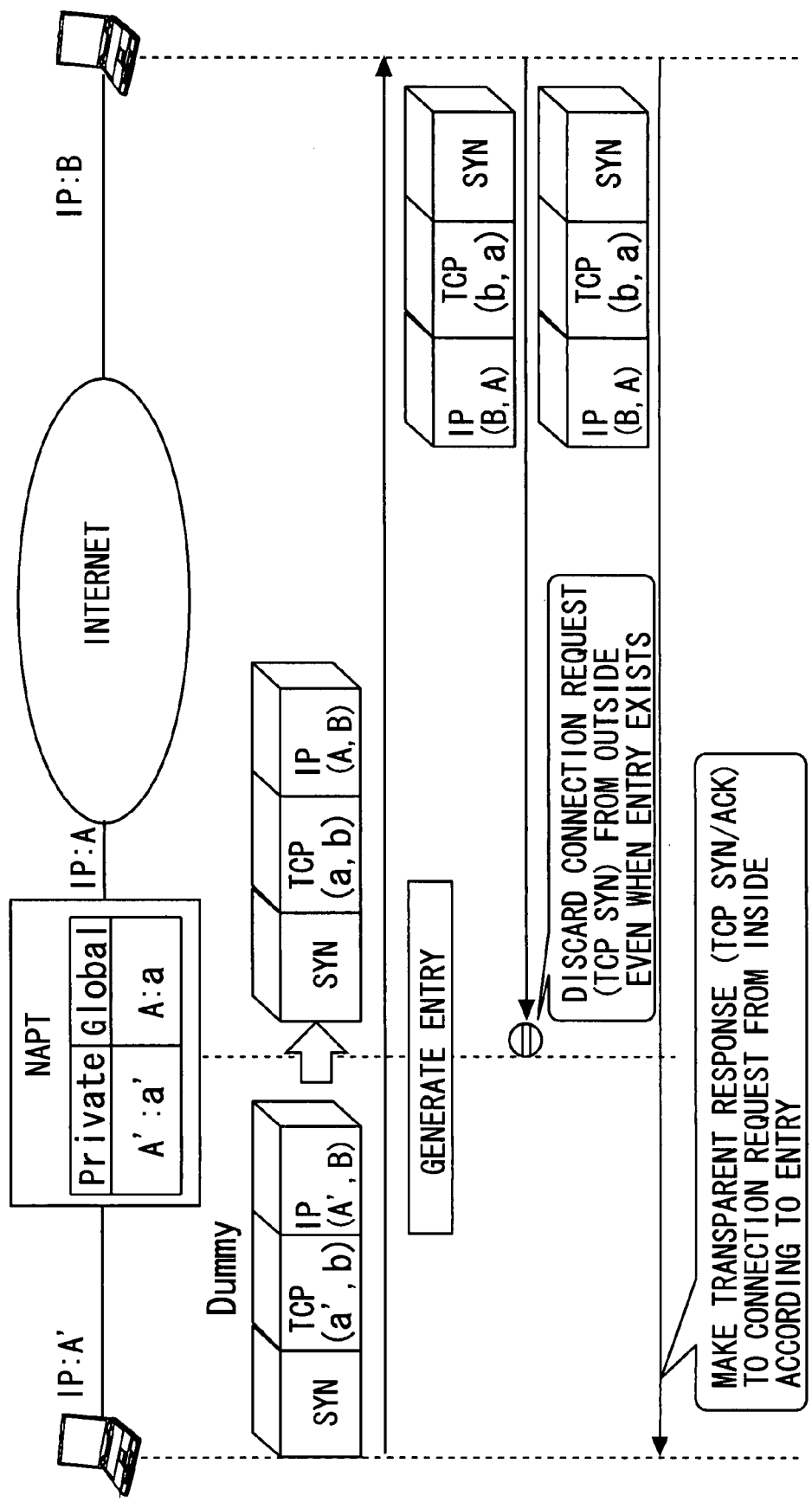
FIG. 13 is an explanatory diagram of a state inspection.

The present invention will hereinafter be described in greater detail with reference to the accompanying drawings. The drawings illustrate a preferred embodiment of the present invention. The present invention can be, however, carried out in many different modes and should not be construed to be limited to the embodiment described in the present specification. More essentially, the embodiment is provided so that the disclosure of the present specification becomes thorough and perfect, and so that the scope of the present invention is sufficiently conveyed to those skilled in the art. The same reference numerals and symbols represent the same components throughout.

[Configuration and Function of IP Application Service Providing System]

Figure 14:
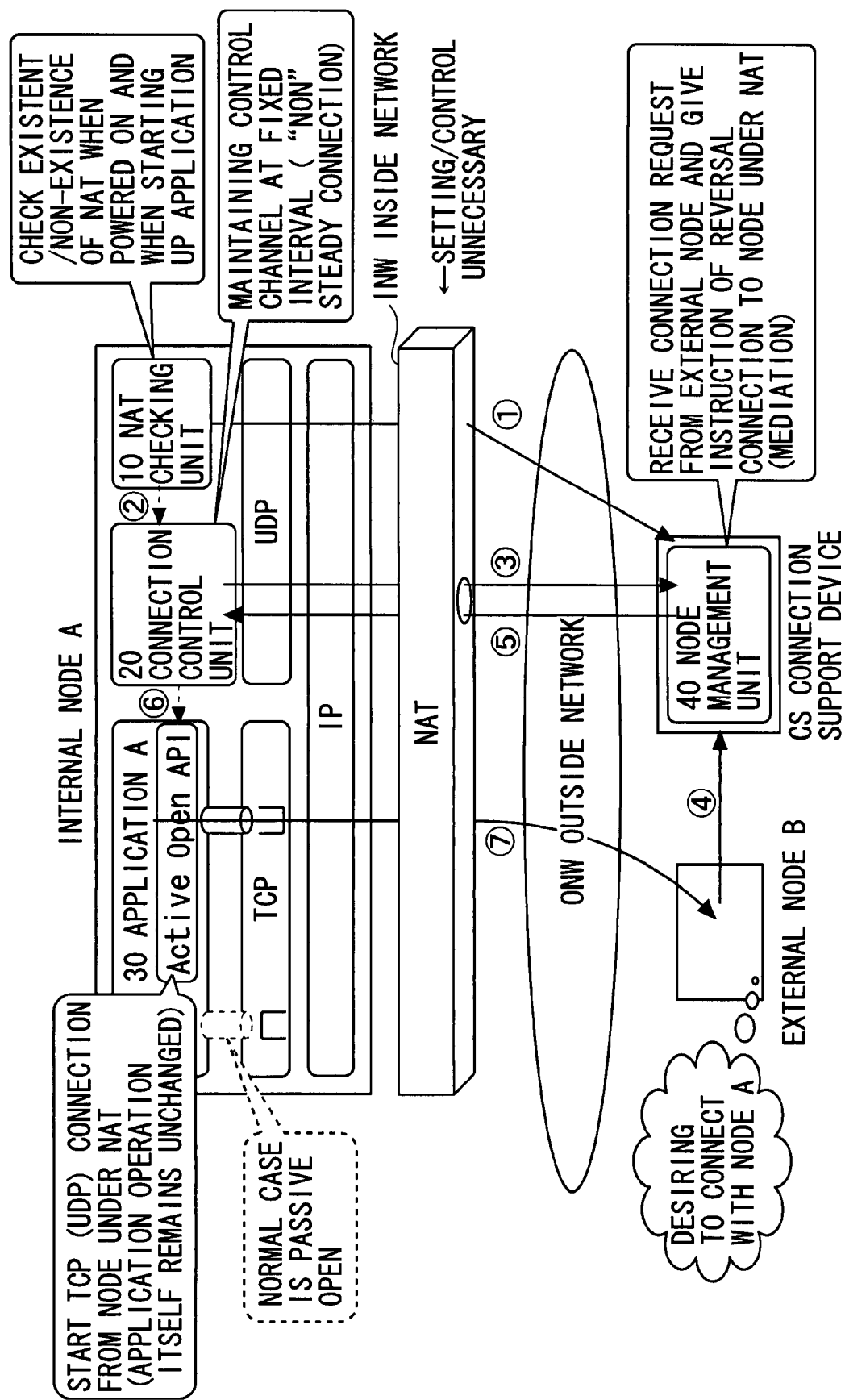
FIG. 14 is a block diagram showing system architecture in one embodiment of the present invention.

Referring to FIG. 14 showing architecture of the IP application service providing system in one embodiment of the present invention, in a network configuration via a network address translation (or translator) NAT (which might simply be abbreviated to NAT) serving as a gateway device set to permit communication from the inside toward the outside (which is referred to as outbound communication), i.e., the communication from an inside network (private network) INW such as an in-office network or a home network toward an outside network (public network) ONW such as the Internet or an application service network, the IP application service providing system implements, through the NAT, connection support enabling communication (inbound communication) from the outside toward the inside in IP application communication intended between an internal node A concealed from the outside network ONW and an external node B. Note that as for a monitoring port, there is also a gateway device that is pre-permitted to receive the inbound communication.

The following three conditions are required of the IP application service providing system in order to enable the OP application service to be provided without being aware of an existence/non-existence (intermediary status) of the gateway device such as the network address translation NAT or a firewall FW (NAT/FW).

Condition 1: [NAT-Traversal] shall be enabled irrespective of types of the NATs.
Condition 2: A protocol specification of the application shall remain unchanged without depending on the existence/non-existence of the NAT.
Condition 3: The connection can be established at arbitrary timing from the external node B.

For fulfilling these conditions, the IP application service providing system executes basically the following three processes in such a way that a connection support device CS of the outside network (service network) ONW mediates the IP application communication between the nodes A and B.

A first process (first step): a control packet is periodically transmitted to the connection support device CS from the node (internal node) A as a subordinate to the NAT. Namely, a NAT entry of a control channel path is maintained. The control packet undergoes IP address/port translation in the NAT and is thus received by the connection support device CS (see an encircled numeral 3 in FIG. 14).

A second process (second step): The connection support device CS receives a connection request from the external node B and notifies the internal node A of a connecting destination IP address/port pair of the external node B by use of the control packet. At this time, if the NAT entry of the control channel path is maintained, the notification can be given at arbitrary timing (see encircled numerals 4 and 5 in FIG. 14).

A third process (third step): The internal node A starts establishing a transport layer protocol (TCP (Transmission Control Protocol)/UDP (User Datagram Protocol)) connection with the connecting destination IP address/port pair which the internal node A has been notified of, i.e., opens actively an IP application data channel. Because of starting the transport layer protocol connection to the outside from the inside of the NAT, the connection is enabled without depending on the NAT, and, because of a transport layer connecting direction depending on none of the process intrinsic to the application, the third process can be defined as an application program interface API common to the applications (see an encircled numeral 7 in FIG. 14).

In the IP application service providing system, the internal node A and the NAT exist in the inside network INW, and the connection support device CS exists in the server provided by a provided of the outside network ONW.

Figure 15:
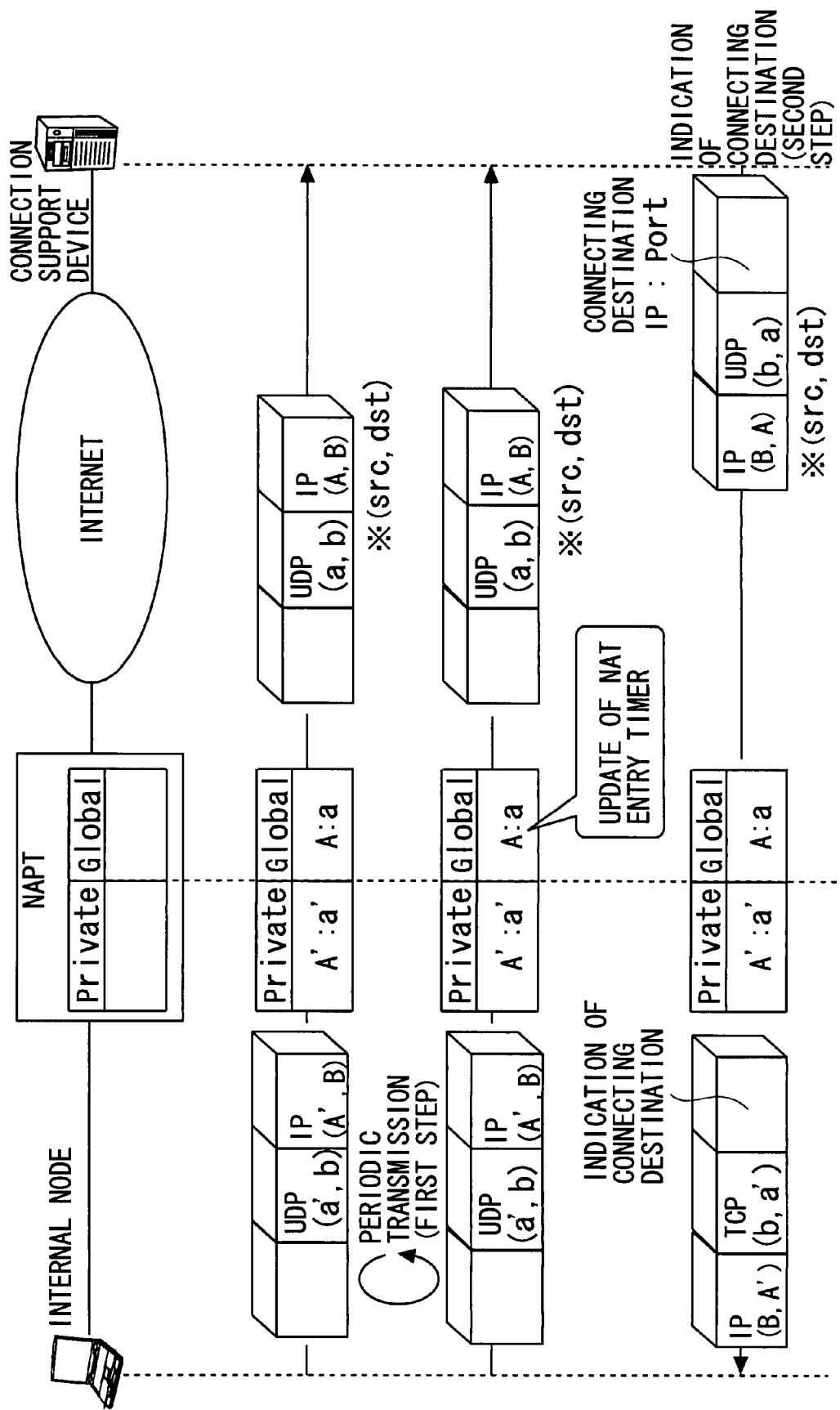
FIG. 15 is an explanatory diagram of the system in one embodiment of the present invention.

In the IP application service providing system, the control channel protocol can involve using the UDP and is a connectionless protocol, and hence, if the NAT entry of the control channel path is maintained, the second step can be executed at the arbitrary timing from the connection support device CS. Namely, supposing that a source (after the NAT translation) of the UDP packet in the first step is specified by IP (address): Port=A: a and a destination (the connection support device CS) thereof is specified by IP: Port=B: b, the second step utilizes a scheme that the packet reaches the internal node A traversing the NAT by setting the source IP: Port=B: b and the destination IP: Port=A: a (see FIG. 15).

Figure 16:
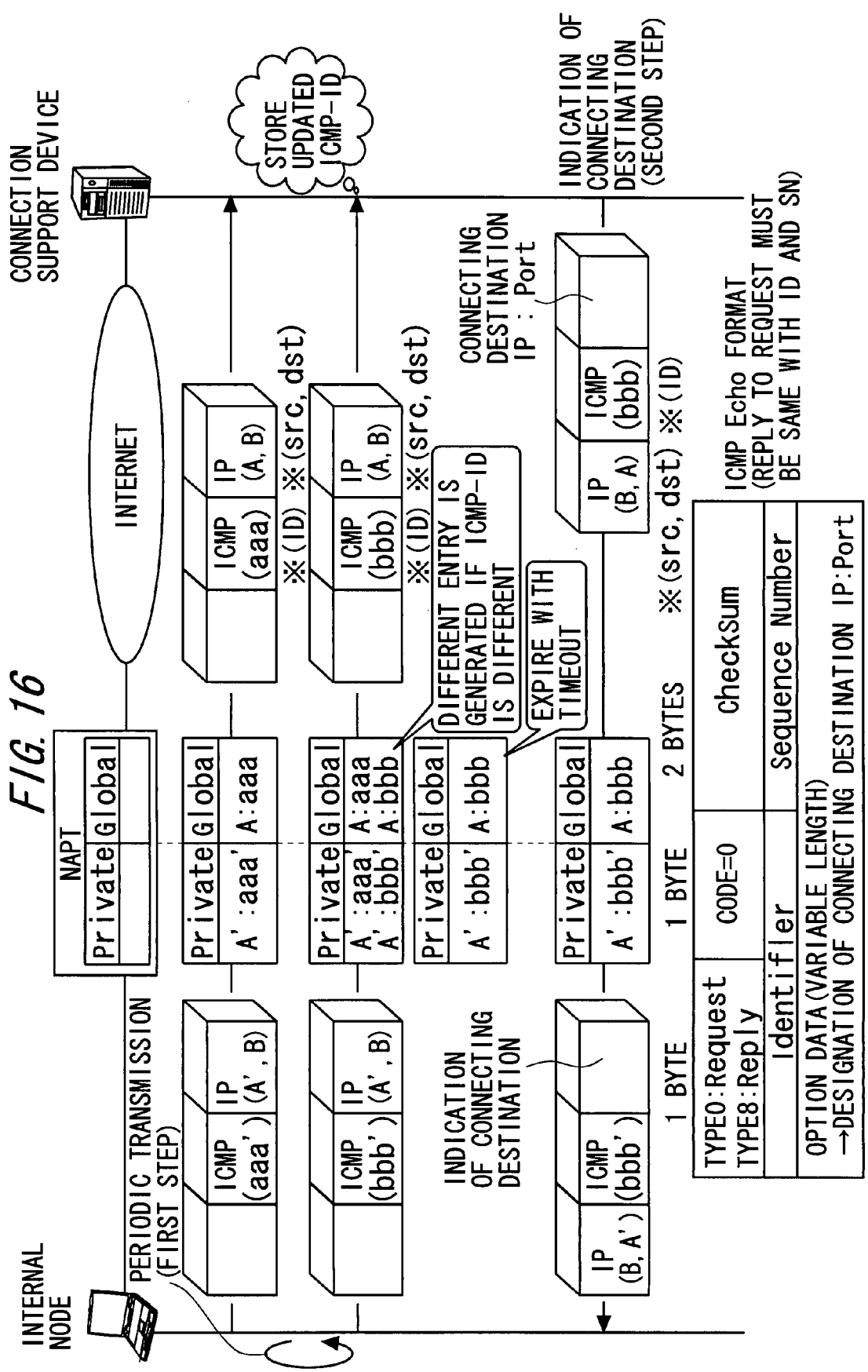
FIG. 16 is an explanatory diagram of the system in one embodiment of the present invention.

Further, in the IP application service providing system, ICMP (Internet Control Message Protocol) can be employed as the control channel protocol and is the connectionless protocol, and therefore, if the NAT entry of the control channel path is maintained, the second step can be executed at the arbitrary timing from the connection support device CS. The ICMP does not include a port number unlike the UDP/TCP, however, the majority of NAPTs (Network Address Port Translations) enable Ping (Packet Internet Groper) between the internal node A and the external node B by managing an Identifier field (and also a Sequence Number field depending on implementation) as the NAT entry in the same way as in the case of the port number with respect to Ping (ICMP Echo). The connection support device CS, by utilizing this characteristic, stores the Identifier of the ICMP packet received in the first step and uses the Identifier in the second step, whereby the packet reaches the internal node A (see FIG. 16).

Figure 17:
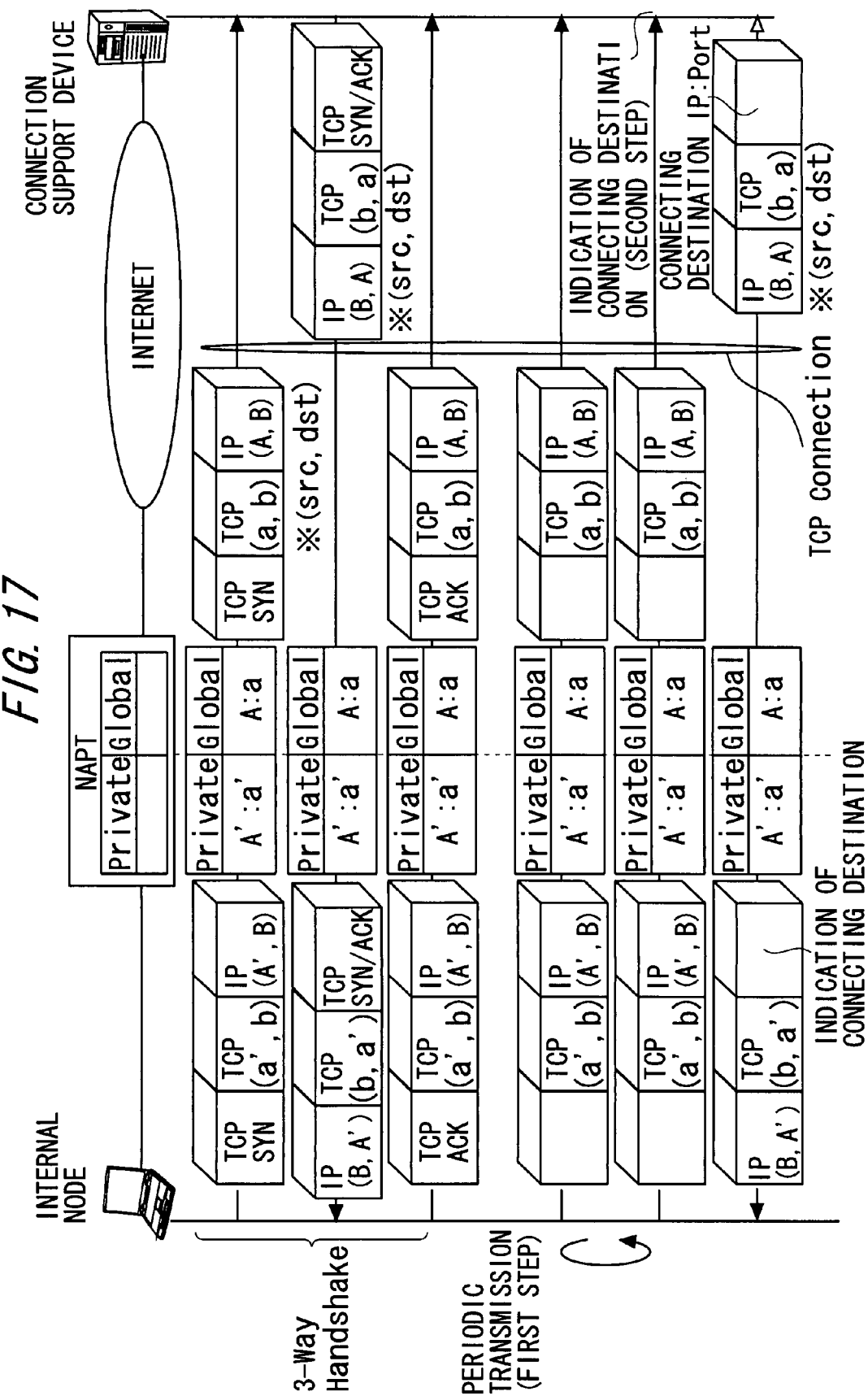
FIG. 17 is an explanatory diagram of the system in one embodiment of the present invention.

Moreover, the TCP can be employed as the control channel protocol and is a connection-oriented protocol, and the connection of the control channel needs holding, however, the reliability of the control channel is enhanced to a degree corresponding to that (see FIG. 17).

Figure 18:
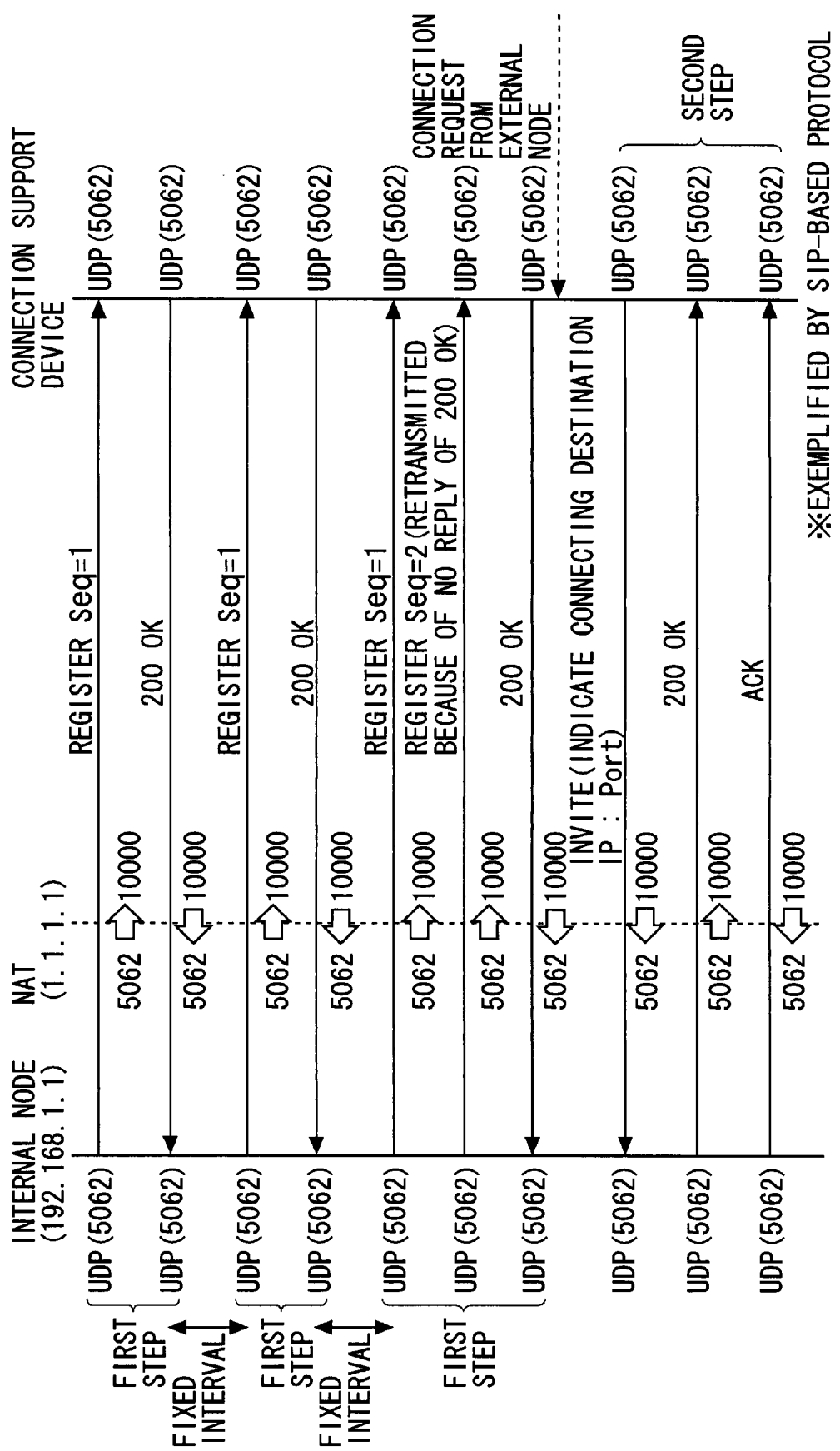
FIG. 18 is an explanatory diagram of the system in one embodiment of the present invention.

In the IP application service providing system, the UDP or the ICMP is used as the control channel protocol, whereby the first step and the second step can be a synchronously executed. According to this scheme, the connection support device CS has no necessity of holding the connection of the control channel, resulting in a smaller processing load. In each step, a transaction (which is completed by sending back a response to a request) is executed, and, if, e.g., no response is sent back, the retransmission can be made, thereby enabling the reliability to be enhanced. As a matter of course, if the transaction is not executed, the processing load can be reduced to a degree corresponding to this unexecuted transaction (see FIG. 18).

Figure 19:
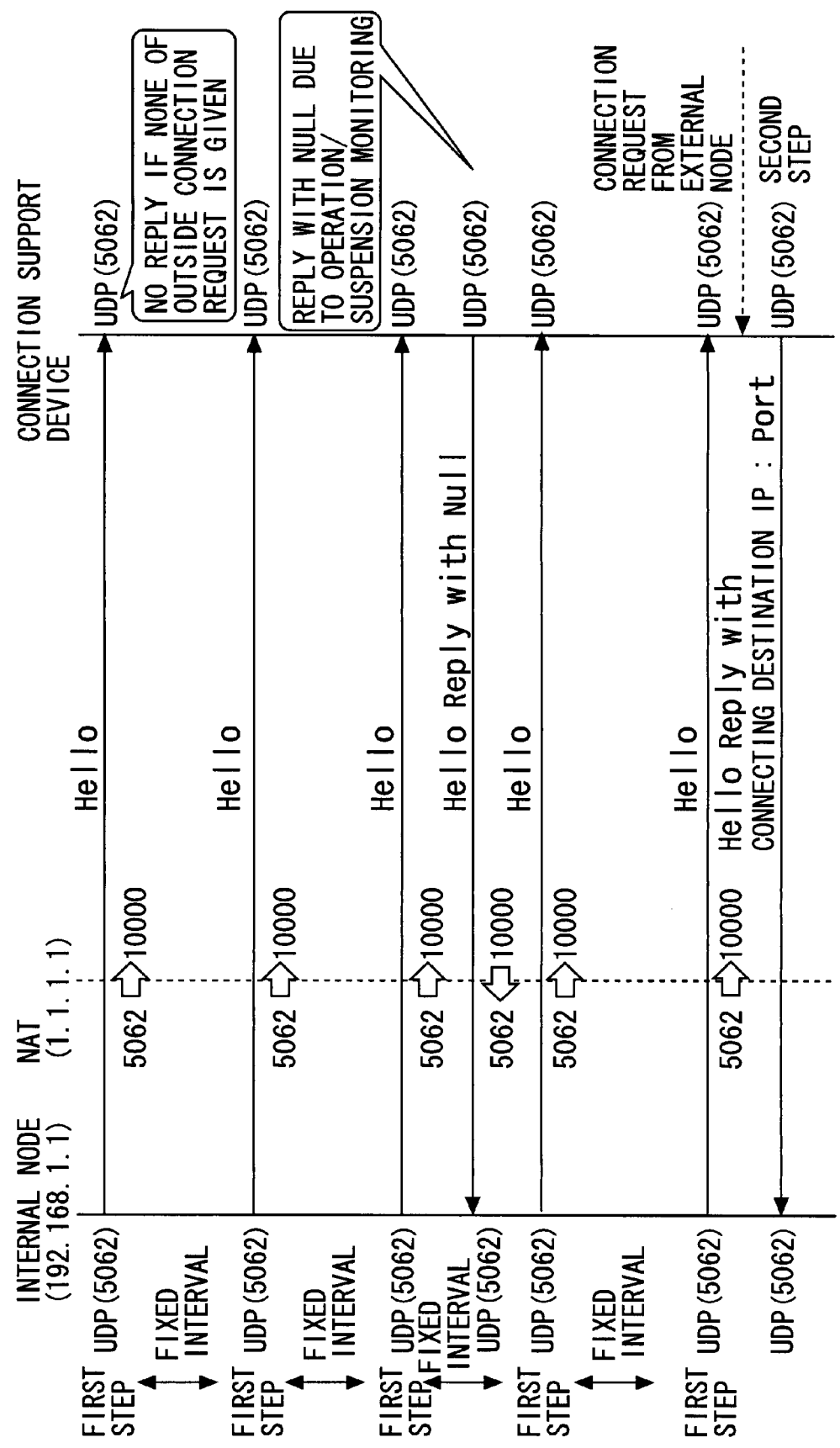
FIG. 19 is an explanatory diagram of the system in one embodiment of the present invention.

Further, the second step can be executed as the response to the control packet transmitted in the first step. Namely, the first step and the second step operate synchronously as a series of transactions. The second step is that if none of the connection request is given from the external node B, no response or a null (NULL) response is sent back with respect to the first step, and, if the request is given, a response message is assembled to contain the connecting destination IP address/port pair of the external node B (see FIG. 19).

Figure 20:
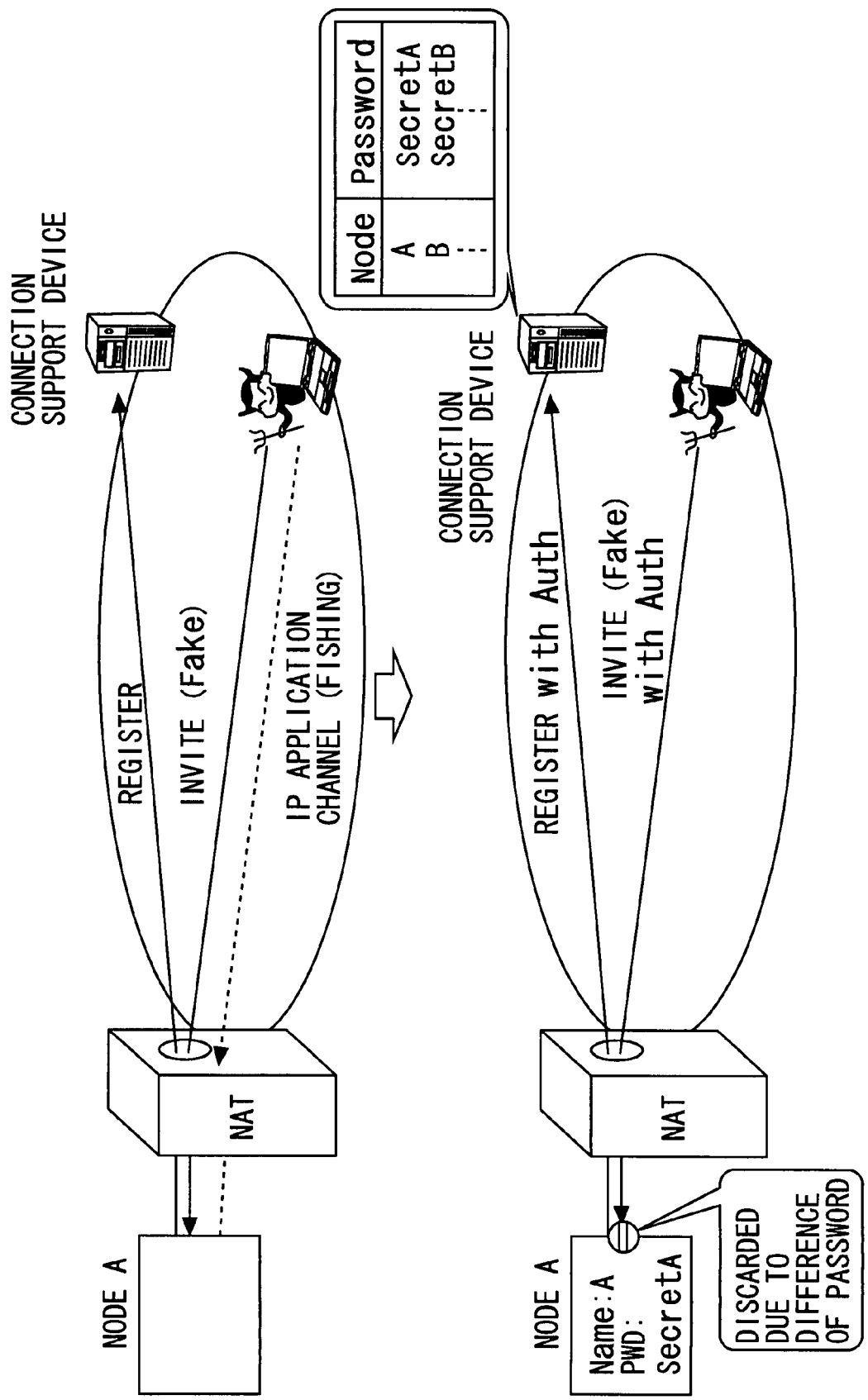
FIG. 20 is an explanatory diagram of the system in one embodiment of the present invention.

The IP application service providing system has security durability by taking a mechanism for preventing an invalid access from the malicious third party such as authenticating the source (sender) of the control packet, encrypting a payload (e.g., the IP address/port pair of the external node B, of which to notify in the step 2) and conducting a digital sign for preventing (detecting) falsification (see FIG. 20).

Figure 21:
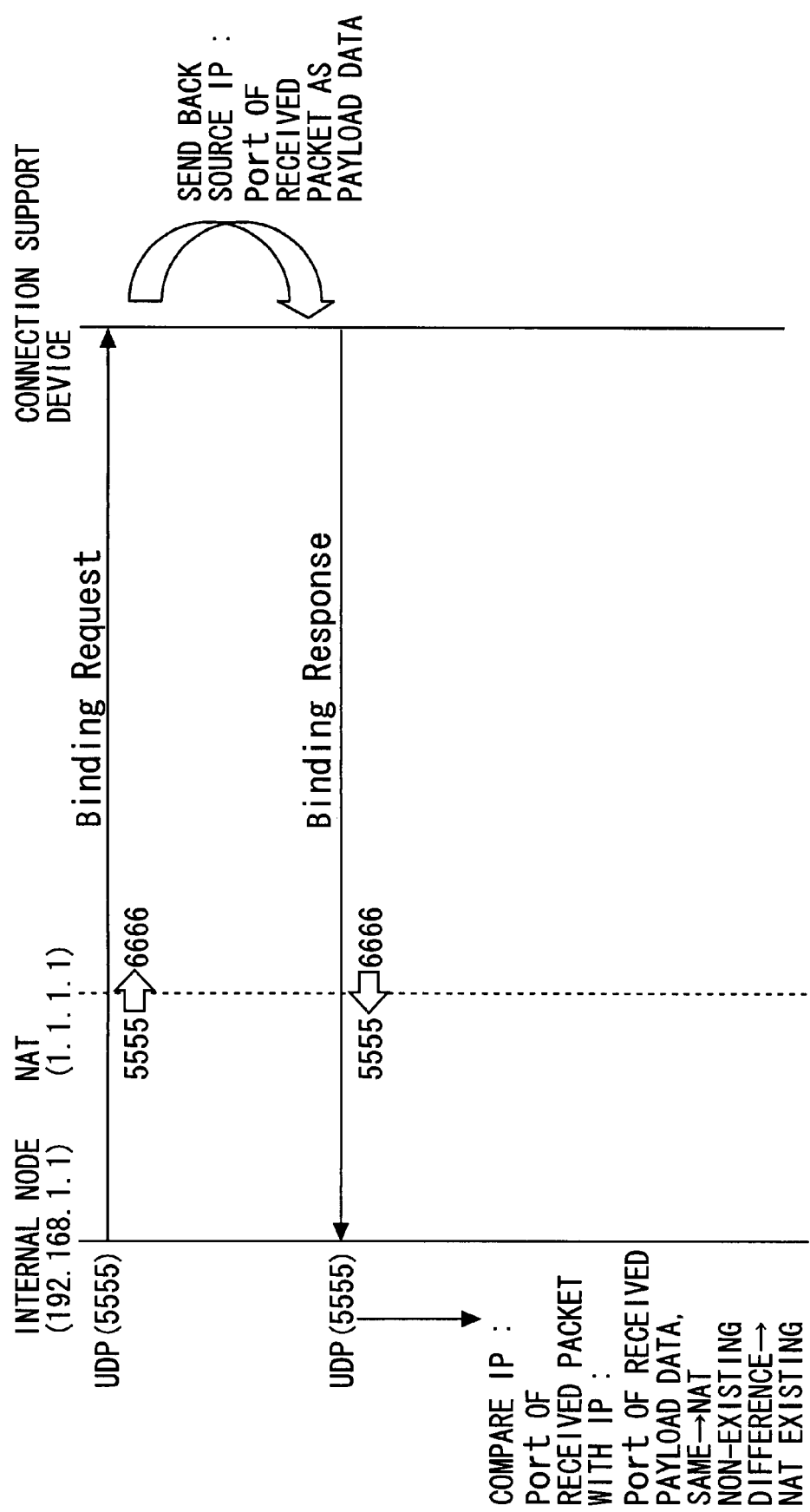
FIG. 21 is an explanatory diagram of the system in one embodiment of the present invention.

In the IP application service providing system, it is judged whether or not the first through third steps are to be carried out by knowing whether the internal node A itself is situated as the subordinate to the NAT/FW or not. This is because the IP application communication is enabled without carrying out these steps if not subordinated to the NAT/FW. It should be noted that the process (step) of checking whether situated as the subordinate to the NAT/FW or not can involve using a technology such as an STUN (Simple Traversal of UDP through NATs) protocol specified by, e.g., RFC3489. There is, however, no necessity of judging even the type of the NAT as by STUN, and it may be sufficient to judge only whether the NAT/FW exists or not (see FIG. 21).

Figure 22:
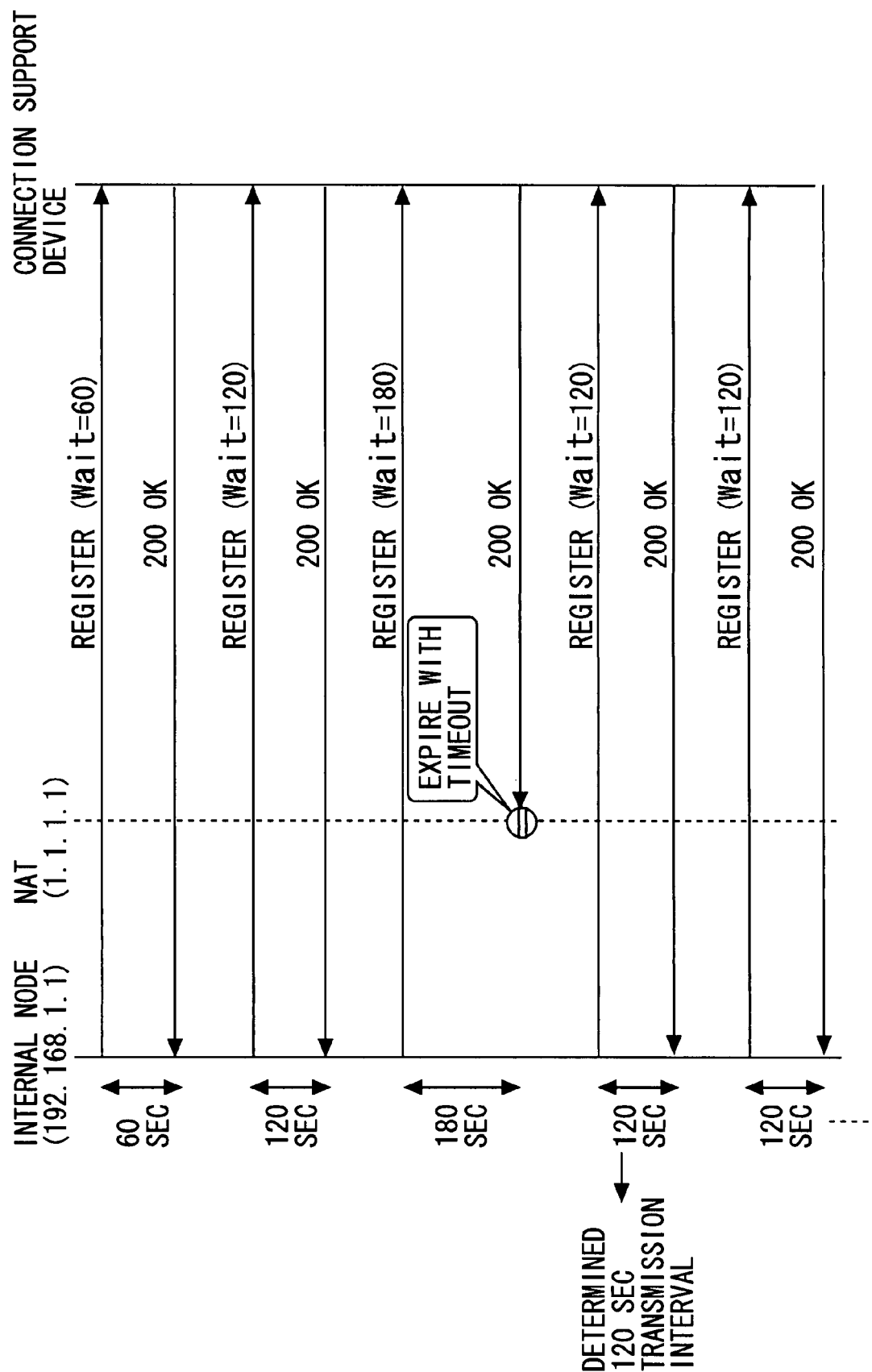
FIG. 22 is an explanatory diagram of the system in one embodiment of the present invention.

In the IP application service providing system, a NAT checking unit 10 of the internal node A checks an entry timer of the NAT/FW, thereby optimizing the control packet periodic transmission interval in the first step. The process (step) of checking the entry timer can be done by checking, e.g., such an operation that a request message containing a period of waiting time till a response is sent back is transmitted to the connection support device CS from the internal node A, and the connection support device CS sends back the response after waiting this period of time in a way that gradually extends the waiting time till the response can not be received. Note that there is a case in which the entry timer value might be different according to TCP and UDP, depending on the type of the NAT, and hence the respective entry timer values are to be checked (see FIG. 22).

In the IP application service providing system, a connection control unit 20 of the internal node A has (implements), as a communication program module, a processing function of periodically transmitting the control packet aiming at notifying of a control channel port and at maintaining the NAT/FW entry of the control channel, which is described in the first step. It is to be noted that this module operates independently of each IP application 30 and enables the control of the plurality of IP applications (see FIG. 23).

In the IP application service providing system, a node management unit 40 of the connection support device CS has (implements), as a communication program module, a function of managing the control channel port of which to notify in the first step and notifying of the connecting destination address/port pair by use of the control channel when the IP application communication request occurs, which is described in the second step (see FIG. 23).

In the IP application service providing system, the application 30 has (implements), as a communication program module, a function of receiving the notification of the connecting destination address/port pair via the control channel in the second step and actively opening the IP application data channel, which is described in the third step. It should be noted that the present program module can be originally applied (extended) to a passive open application (e.g., a server application), and enables, for example, the connection from the internal node A subordinated to the same NAT as the passive open connection as hitherto done. Further, the present program module can be defined as the API (Active Open API) common to the applications because of depending on none of the processes intrinsic to the applications (see FIG. 23).

In the IP application service providing system, the NAT checking unit 10 of the internal node A has (implements), as a communication program module, a function of checking whether the NAT/FW exists or not and checking the NAT/FW timer (see FIG. 23).

The functions (the communication program modules) possessed by the connection control unit 20 and the IP application 30 are the functions that are not required to operate if the internal node A is not subordinated to the NAT/FW. The NAT checking unit 10 is a program module management mechanism of checking whether the NAT/FW exists or not and causing, only when the NAT/FW exists, the process to function by loading the communication program module into a CPU and a memory (see FIG. 25).

Figure 26:
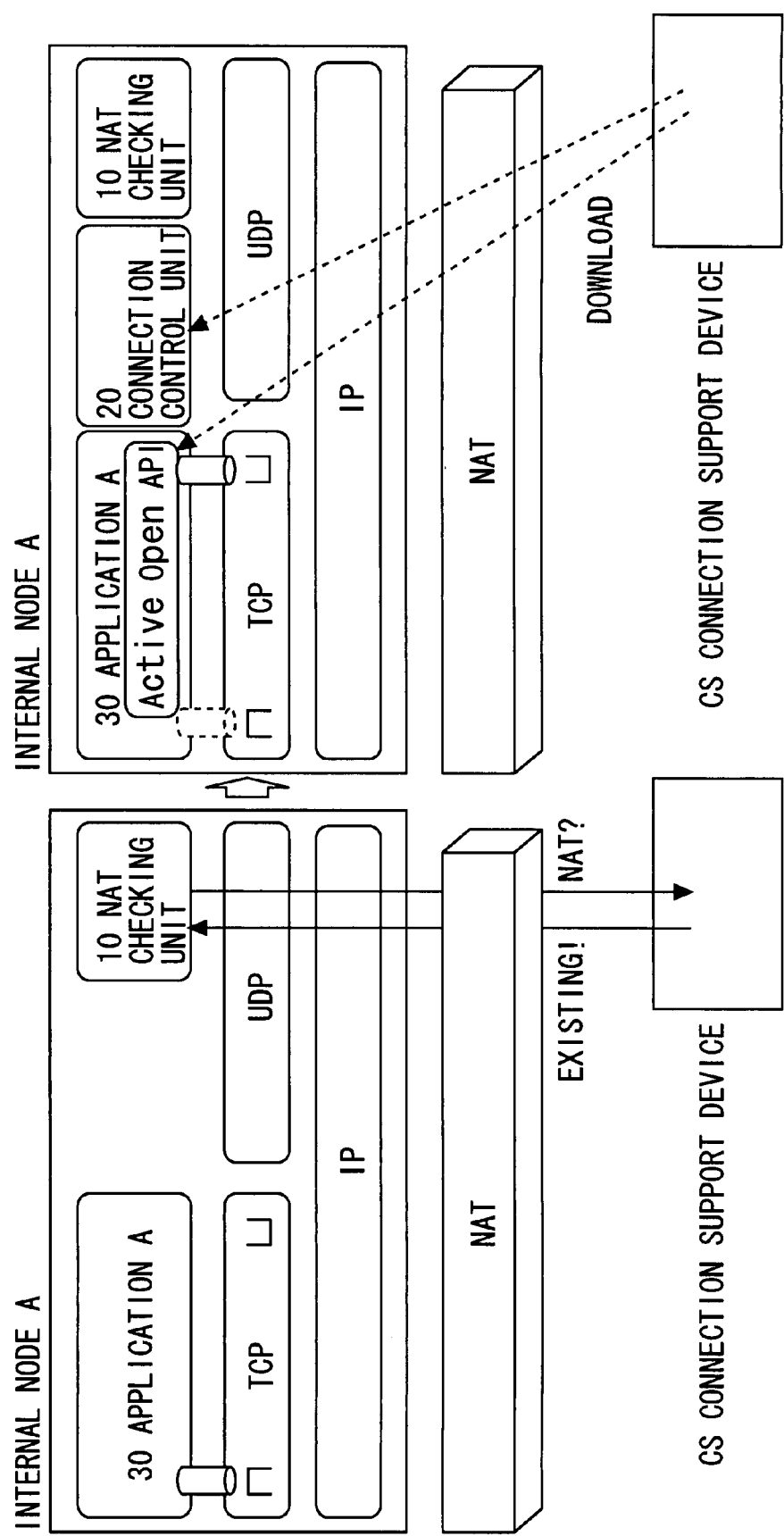
FIG. 26 is an explanatory diagram of the system in one embodiment of the present invention.

The functions (the communication program modules) possessed by the connection control unit 20 and the IP application 30 are not required to be retained in a storage area (HDD etc) as well as, needless to say, being unnecessary for operating unless the internal node A is subordinated to the NAT/FW. The NAT checking unit 10 is a program module management mechanism of checking whether the NAT/FW exists or not, then downloading, only when the NAT/FW exists, the communication program module from a downloading destination designated by the connection support device CS and causing the program module to function (see FIG. 26).

The step of checking whether or not the internal node A itself is situated as the subordinate to the NAT/FW, can be carried out as triggered by acquiring the IP address. The trigger of the IP address acquisition is considered such as a startup of the internal node A, a linkup of the interface and a change of the IP address, which is made manually or automatically as based on DHCP (Dynamic Host Configuration Protocol) etc, and such a possibility exists that the NAT/FW might be inserted or removed at this timing depending on a change of the network configuration etc. In the former case, the communication program module of the IP application 30, which has remained unoperating so far, is required to operate, and, in the latter case, because of the necessity being conversely eliminated, it becomes a trigger that strops the operation of this communication program module.

Moreover, the step of checking whether or not the internal node A itself is situated as the subordinate to the NAT/FW, can be carried out as triggered by a startup of a specified IP application 30 intending to establish the NAT-Traversal connection.

[Specific Example of IP Application Service Providing System]

Next, a specific example of the IP application service providing system will be explained by way of one embodiment of the present invention.

Figure 27:
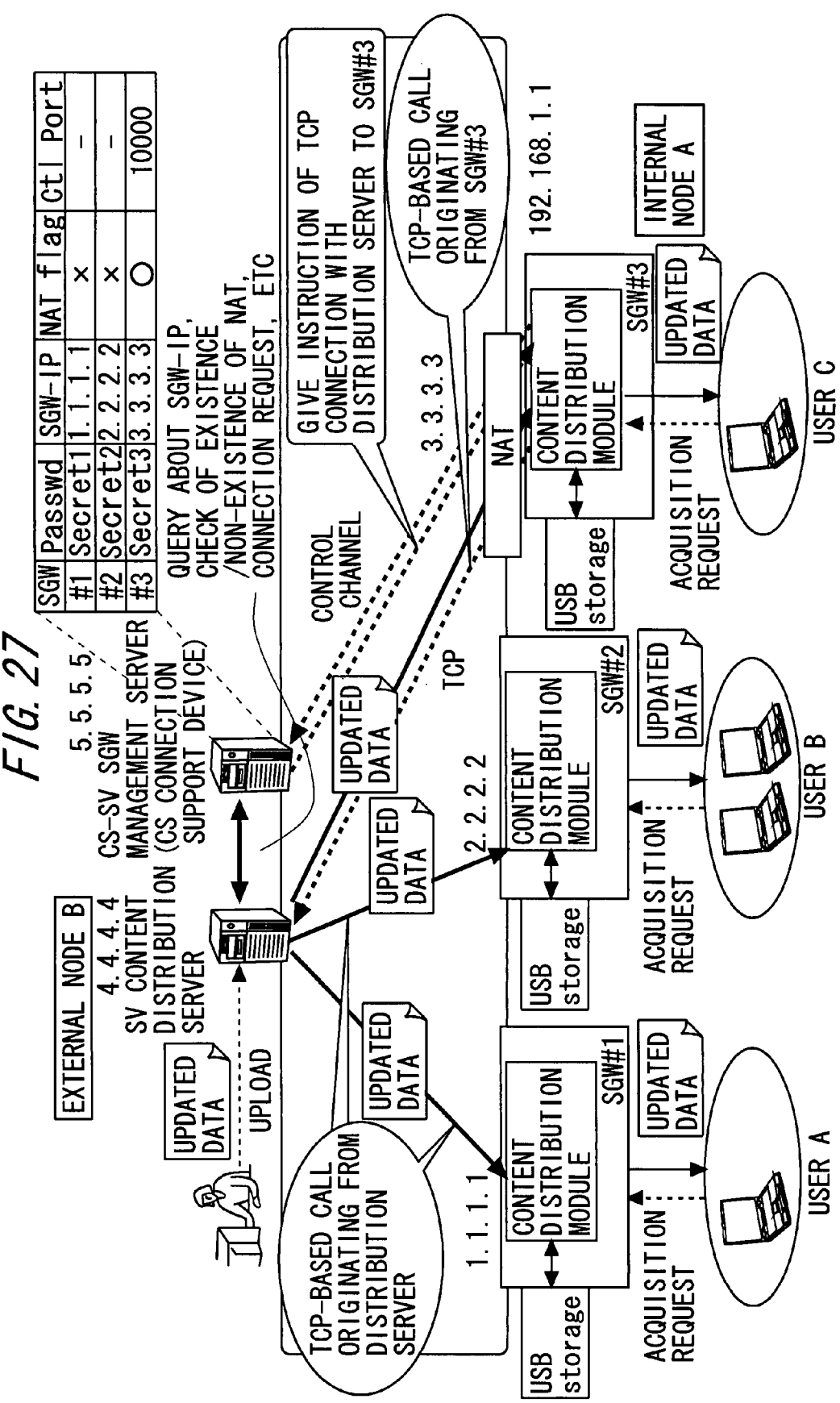
FIG. 27 is an explanatory diagram of a specific example.

Considered herein is a case in which a certain content provider having a content distribution server SV corresponding to the external node B provides users A, B and C with service gateways SGWs (SGW#1-SGW#3), and an updated content is distributed (uploaded) in realtime (see FIG. 27).

In this case, if the NAT/FW does not exist, the TCP connection can be established on an on-demand basis, however, whereas if the NAT/FW exists, the TCP connection cannot be established as described above. Though the NAT entry can be statically set up by a static NAT, this setup is unfriendly to an unaccustomed-to-the-setup user, which might become a big obstacle in terms of providing the service.

Such a method that the contents are periodically subjected to polling from the service gateway SGW and are, if updated, downloaded, is also available, however, this method lacks a realtime characteristic depending on a polling interval, and, it is necessary to develop the applications respectively due to a point that the application protocols (NAT non-existing; upload, NAT existing: download) for providing the contents differ depending on the existence/non-existence of the NAT/FW.

Figure 29:
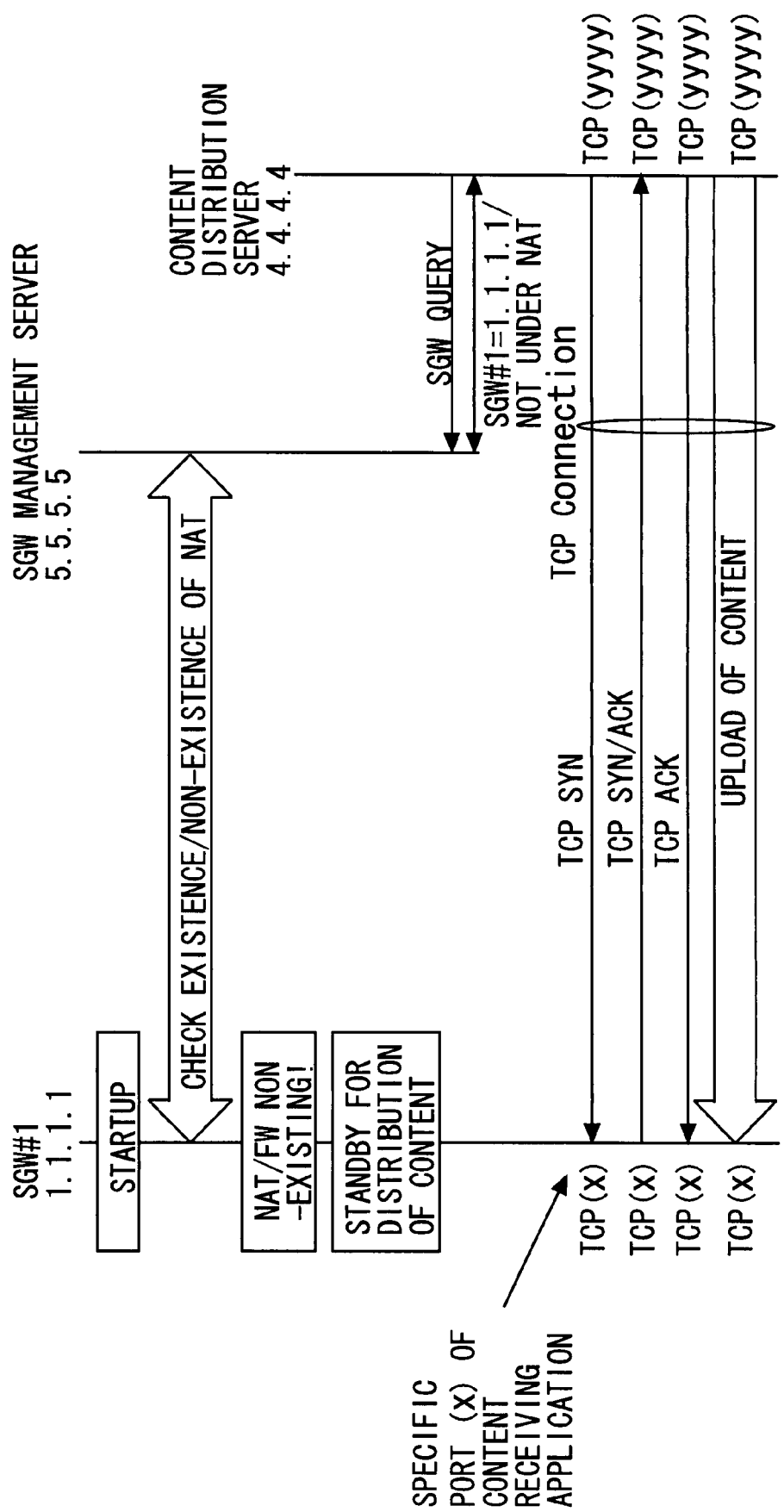
FIG. 29 is an explanatory diagram of a specific example.

This being the case, a purport of accessing an SGW management server (the connection support device CS) CS-SV is previously set in the service gateway SGW as initial registration when acquiring the IP address (as when powered ON), and, on this occasion, it is checked whether the service gateway SGW itself is situated as the subordinate to the NAT/FW. If the NAT/FW does not exist, without taking any particular action, there is a wait for the distribution of the content (the TCP connection request) (see FIG. 29).

Whereas if the NAT/FW exists, the service gateway SGW downloads the connection control module and the Active Open API (the communication program module) from the SGW management server CS-SV and installs these modules. Then, the service gateway SGW periodically transmits the control packet to the SGW management server CS-SV, thus maintaining the control channel. Note that the transmission interval may be such an interval (generally an interval of one through five minutes) of transmitting the control packet as to maintain the NAT entry, resulting in no occurrence of the processing load of the SGW management server CS-SV.

Figure 28:
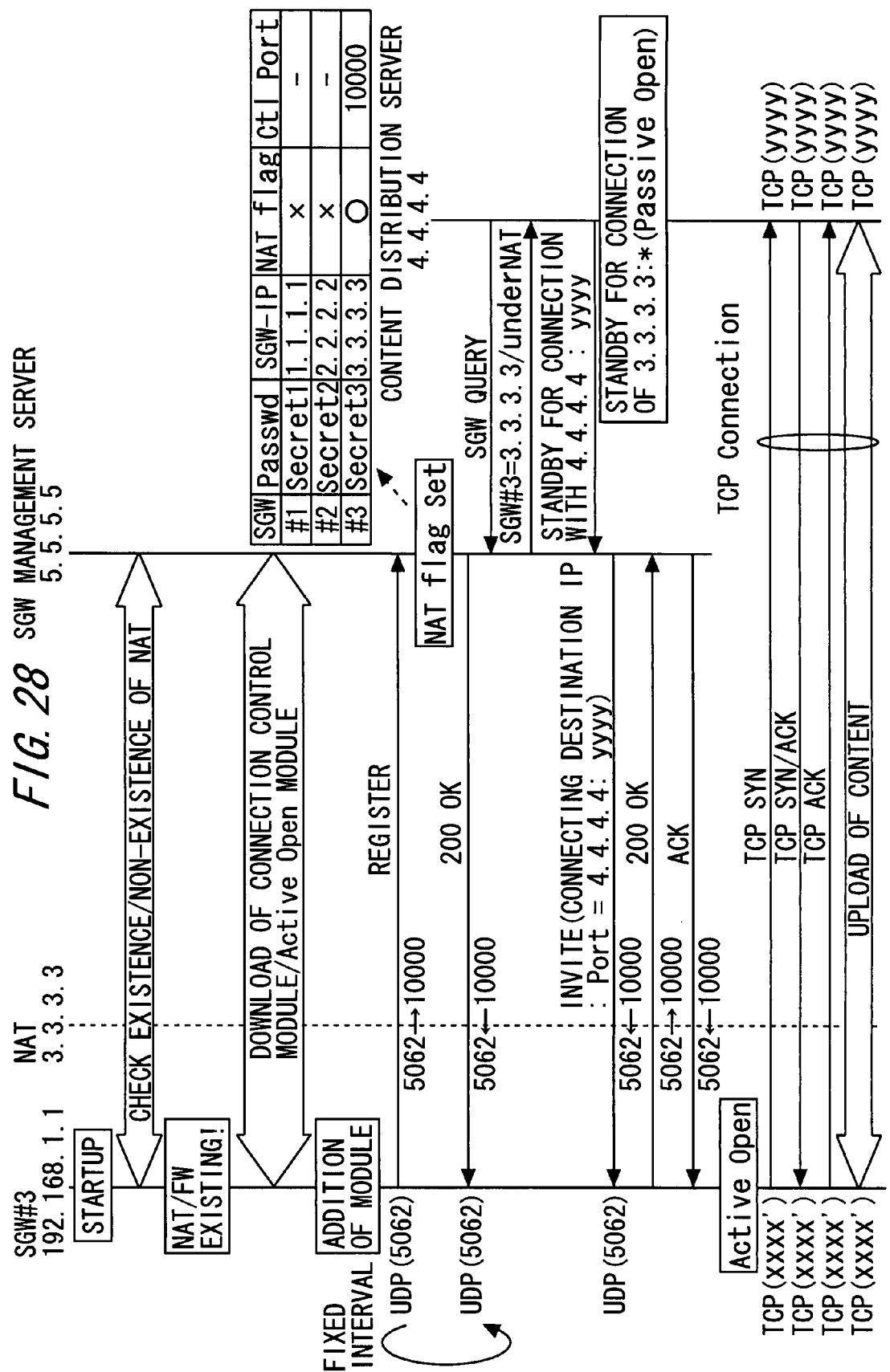
FIG. 28 is an explanatory diagram of a specific example.

The transmission interval can be optimized by executing the step of checking the NAT/FW entry timer. The SGW management server CS-SV manages the IP address of the service gateway SGW when making the initial registration, then judges that the service gateway SGW receiving the control packet is situated as the subordinate to the NAT/FW, and manages a NAT flag and a control channel port as well (see FIG. 28).

On the occasion of distributing the content, the content distribution server SV queries the SGW management server CS-SV about the IP address of each service gateway SGW and about whether the NAT/FW exists or not. As a result of this query, the TCP connection request is given to the service gateways SGW#1 and SGW#2 with the NAT non-existing directly from the content distribution server SV, however, the TCP connection request is sent together with a standby IP Address/Port pair to the service gateway SGW#3 with the NAT existing from the service gateway SGW via the SGW management server CS-SV. The service gateway SGW#3 receives this request and starts establishing the TCP connection with the content distribution server SV.

Note that request verification showing that the request is a regular (valid) request which is i.e., sent from the SGW management server CS-SV and undergoes none of falsification, may involve a combination with the authentication, the encryption, the digital sign and so on. Then, after establishing the TCP connection, the updated content is uploaded to the service gateway SGW regardless of whether the NAT exists or not. Namely, the access can be made at the arbitrary timing without rearranging the applications themselves depending on the existence/non-existence of the NAT.

According to one embodiment discussed above, the IP application service can be provided without being aware of the existence/non-existence of the gateway device such as the NAT/FW (without depending on the type of the gateway device even if existing and at the arbitrary timing).

Further, the control unit is independent of each IP application unit, and the extension depending on none of the process intrinsic to the application is conducted, thereby enhancing the universality.

Moreover, if there exist the applications provided by the plurality of ports of the same category under the NAT/FW, for example, to state it by way of one embodiment discussed above, the TCP connection to the content distribution server SV is actively established from each of the service gateways SGWs even in such a case that the plurality of service gateways SGWs exist under the NAT/FW, whereby a problem of a port conflict does not arise even when the ports used by the service gateways SGWs are of the same category.

MODIFIED EXAMPLE

The processes in one embodiment discussed above are provided as a program executable by a computer and can be also provided through a storage medium such as a CD-ROM and a flexible disc and further via a communication line.

Moreover, the respective processes in one embodiment discussed above can be also carried out in a way that selects and combines an arbitrary plurality of or all of the processes.

The disclosure of Japanese Patent Application No. JP2006-260830 filed on Sep. 26, 2006 including the specification, claims, drawings and abstract is incorporated herein by reference in its entirety.

What is claimed is:

1. A machine enabling inbound communication from the outside toward the inside in IP application communication intended between an internal node concealed from an outside network and belonging to an inside network and an external node belonging to the outside network through a gateway device set to permit only outbound communication from the inside toward the outside, the machine comprising:
  at least one computer executing a program stored on a storage medium to provide:
    a unit periodically transmitting a control packet aiming at notifying of a control channel port and at maintaining a communication permission entry of a control channel path to a connection support device on the outside network from the internal node as the machine subordinated to the gateway device;
    a unit receiving notification of a connecting destination address/port pair associated with the external node via a maintained control channel from the connection support device; and
    a unit actively opening a data channel of an IP application to the notified connecting destination address/port pair; and
    wherein the periodically transmitting the control packet and the receiving the notification of the connecting destination address/port pair associated with the external node are asynchronously carried out, and the receiving is executed if the connection support device receives a connection request from the external node during periodical transmission of the control packet.

2. An IP application service providing method enabling inbound communication from the outside toward the inside in IP application communication intended between an internal node concealed from an outside network and belonging to an inside network and an external node belonging to the outside network through a gateway device set to permit only outbound communication from the inside toward the outside, the method comprising:
  periodically transmitting a control packet aiming at notifying of a control channel port and at maintaining a communication permission entry of a control channel path to a connection support device on the outside network from the internal node subordinated to the gateway device;
  receiving notification of a connecting destination address/port pair associated with the external node via a maintained control channel from the connection support device at the internal node; and
  actively opening a data channel of an IP application to the notified connecting destination address/port pair; and
  wherein the periodically transmitting the control packet and the receiving the notification of the connecting destination address/port pair associated with the external node are asynchronously carried out, and the receiving is executed if the connection support device receives a connection request from the external node during periodical transmission of the control packet.

3. An IP application service providing method according to claim 2, wherein any one of UDP and ICMP is used as a protocol of the control channel.

4. An IP application service providing method according to claim 2, wherein the receiving is carried out as a response to the control packet periodically transmitted.

5. An IP application service providing method according to claim 2, wherein validity, confidentiality and integrity are verified in the transmitting and the receiving, thereby having security durability.

6. An IP application service providing method according to claim 2, further comprising checking whether the gateway device exists or not, and
  wherein the transmitting, the receiving and the opening are executed only when it proves that the internal node is situated as a subordinate to the gateway device.

7. An IP application service providing method according to claim 2, further comprising checking a communication permission entry timer of the gateway device, and
  wherein a transmission interval of the control packet in the transmitting is optimized corresponding to a timer value.

* * * * *